(12) United States Patent
Tyrrell et al.

(10) Patent No.: US 10,616,520 B2
(45) Date of Patent: Apr. 7, 2020

(54) METHOD AND APPARATUS FOR ON-CHIP PER-PIXEL PSEUDO-RANDOM TIME CODED EXPOSURE

(71) Applicant: Massachusetts Institute of Technology, Cambridge, MA (US)

(72) Inventors: Brian M. Tyrrell, Brookline, NH (US); Christy Fernandez Cull, Sunnyvale, CA (US); Andrew K. Bolstad, Arlington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 16/284,680

(22) Filed: Feb. 25, 2019

(65) Prior Publication Data

US 2019/0335129 A1   Oct. 31, 2019

Related U.S. Application Data

(63) Continuation of application No. 15/678,439, filed on Aug. 16, 2017, now Pat. No. 10,250,831, which is a
(Continued)

(51) Int. Cl.
*H04N 5/3745* (2011.01)
*H04N 5/335* (2011.01)
*H04N 7/18* (2006.01)

(52) U.S. Cl.
CPC ......... *H04N 5/37455* (2013.01); *H04N 5/335* (2013.01); *H04N 7/18* (2013.01)

(58) Field of Classification Search
CPC ............ H04N 7/18; H04N 7/183; H04N 5/33; H04N 5/772; H04N 5/913; H04N 5/3355;
(Continued)

(56) References Cited

U.S. PATENT DOCUMENTS 6,678,039 B2 * 1/2004 Charbon ................ G01S 7/487
342/135
7,602,183 B2 * 10/2009 Lustig .................. G01R 33/561
324/307
(Continued)

OTHER PUBLICATIONS

Baraniuk, R. et al. "A Simple Proof of the Restricted Isometry Property for Random Matrices," Constructive Approximation, vol. 28, pp. 253-263, Dec. 2008.
(Continued)

*Primary Examiner* — Pritham D Prabhakher
(74) *Attorney, Agent, or Firm* — Smith Baluch LLP

(57) ABSTRACT

Conventional methods for imaging transient targets are constrained by a trade-off between resolution and frame rate, and transient targets moving faster than the detector frame typically result in image blurring. Imagers using digital-pixel focal plane arrays ("DFPAs") have on-chip global pixel operation capability for extracting a single transient-feature (i.e., single-frequency discrimination) in a snapshot that depends on the number of counters implemented per pixel. However, these DFPA systems are not capable of multi-target and multi-frequency discrimination. Imagers described herein achieve multi-target transient signature discrimination orders of magnitude faster than the readout frame rate using in-pixel electronic shuttering with a known time-encoded modulation. Three-dimensional (x,y,t) data cube reconstruction is performed using compressive sensing algorithms.

19 Claims, 34 Drawing Sheets

Related U.S. Application Data continuation of application No. 14/789,601, filed on Jul. 1, 2015, now Pat. No. 9,743,024.

(58) Field of Classification Search
CPC .. H04N 5/37455; H04N 5/378; H04N 5/3765; H04N 5/3595; H04N 5/3742; H04N 5/335; H04N 5/2355; H04N 5/23254; H04N 5/23267; H04N 5/355; H04N 5/35572; H04N 5/35581; H03M 1/004; H03M 1/123; H03M 1/60; H03M 1/001; H03M 1/145; H03M 1/12; H03K 23/548; H03K 21/023; G11C 19/00; G11B 20/00086; H04L 9/0631
USPC ........................................................ 348/302
See application file for complete search history.

(56) References Cited

U.S. PATENT DOCUMENTS

| | | | | |
|---|---|---|---|---|
| 7,928,893 | B2* | 4/2011 | Baraniuk | G01S 7/295 342/25 F |
| 8,179,296 | B2 | 5/2012 | Kelly et al. | |
| 8,300,113 | B2 | 10/2012 | Cooke et al. | |
| 8,426,797 | B2* | 4/2013 | Aull | H04N 5/37455 250/214 R |
| 8,570,388 | B2 | 10/2013 | Bub | |
| 8,605,853 | B2* | 12/2013 | Schultz | H03M 1/004 377/118 |
| 8,692,176 | B2* | 4/2014 | Kelly | G11B 20/00086 250/208.1 |
| 8,717,484 | B2 | 5/2014 | McMackin et al. | |
| 8,717,492 | B2 | 5/2014 | McMackin et al. | |
| 8,761,525 | B2* | 6/2014 | Singh | H04N 9/07 382/166 |
| 8,848,091 | B2* | 9/2014 | Baraniuk | H04L 25/20 348/335 |
| 8,860,835 | B2 | 10/2014 | Kelly et al. | |
| 8,933,832 | B2* | 1/2015 | Kelly | H03M 1/145 341/155 |
| 9,070,218 | B2 | 6/2015 | Bernal et al. | |
| 9,159,446 | B2 | 10/2015 | Schultz et al. | |
| 9,270,895 | B2 | 2/2016 | Kelly et al. | |
| 9,325,947 | B2 | 4/2016 | Bridge et al. | |
| 9,344,736 | B2* | 5/2016 | Jiang | H04N 19/169 |
| 9,385,738 | B2 | 7/2016 | Kelly et al. | |
| 9,448,162 | B2* | 9/2016 | Zhai | H03K 21/38 |
| 9,450,597 | B1 | 9/2016 | Ahmed et al. | |
| 9,451,191 | B2 | 9/2016 | Guicquero et al. | |
| 9,491,389 | B2 | 11/2016 | Kelly et al. | |
| 9,615,038 | B2 | 4/2017 | Kelly et al. | |
| 9,712,771 | B2 | 7/2017 | Kelly et al. | |
| 9,743,024 | B2 | 8/2017 | Tyrrell et al. | |
| 9,762,983 | B2 | 9/2017 | Zhao et al. | |
| 9,768,785 | B2 | 9/2017 | Schultz et al. | |
| 9,866,770 | B2 | 1/2018 | Colonero et al. | |
| 10,142,567 | B2 | 11/2018 | Colonero et al. | |
| 10,250,831 | B2 | 4/2019 | Tyrrell et al. | |
| 2006/0239336 | A1* | 10/2006 | Baraniuk | H04L 25/20 375/216 |
| 2010/0226495 | A1 | 9/2010 | Kelly et al. | |
| 2011/0235771 | A1* | 9/2011 | Aull | H04N 5/355 377/19 |
| 2012/0038786 | A1 | 2/2012 | Kelly et al. | |
| 2012/0038805 | A1 | 2/2012 | Kelly et al. | |
| 2012/0038819 | A1 | 2/2012 | McMackin et al. | |
| 2012/0213270 | A1* | 8/2012 | Baraniuk | H04L 25/20 375/240.01 |
| 2012/0314099 | A1 | 12/2012 | Kelly et al. | |
| 2013/0003911 | A1 | 1/2013 | Schultz et al. | |
| 2013/0070138 | A1 | 3/2013 | Baraniuk et al. | |
| 2013/0128042 | A1 | 5/2013 | Bridge et al. | |
| 2013/0335256 | A1* | 12/2013 | Smith | G01S 13/887 342/22 |
| 2014/0061442 | A1 | 3/2014 | Denham | |
| 2014/0197303 | A1 | 7/2014 | Kelly et al. | |
| 2014/0211039 | A1 | 7/2014 | Herman et al. | |
| 2014/0231620 | A1 | 8/2014 | Oike et al. | |
| 2014/0321600 | A1 | 10/2014 | Schultz et al. | |
| 2015/0003738 | A1 | 1/2015 | Bernal et al. | |
| 2015/0036005 | A1 | 2/2015 | Kelly et al. | |
| 2015/0070555 | A1 | 3/2015 | Guicquero et al. | |
| 2015/0116563 | A1 | 4/2015 | Herman et al. | |
| 2015/0382000 | A1* | 12/2015 | Jiang | H04N 19/169 382/233 |
| 2017/0026603 | A1 | 1/2017 | Kelly et al. | |
| 2017/0208274 | A1 | 7/2017 | Kelly et al. | |
| 2017/0366763 | A1 | 12/2017 | Lin et al. | |
| 2018/0035067 | A1 | 2/2018 | Tyrrell et al. | |
| 2018/0160068 | A1 | 6/2018 | Kelly et al. | |
| 2019/0068279 | A1 | 2/2019 | Shaw et al. | |
| 2019/0075264 | A1 | 3/2019 | Kelly et al. | |
| 2019/0104269 | A1 | 4/2019 | Grossmann et al. | |
| 2019/0124279 | A1 | 4/2019 | Colonero et al. | |

OTHER PUBLICATIONS

Ben-Ezra, M. et al., "Video Super-Resolution Using Controlled Subpixel Detector Shifts," IEEE Transactions on Pattern Analysis and Machine Intelligence, vol. 27, No. 6, pp. 977-987, Jun. 2005.

Bioucas-Dias, J.M. et al., "A new TwIST: Two-Step Iterative Shrinkage/Thresholding Algorithms for Image Restoration," IEEE Transactions on Image Processing, vol. 16, No. 12, pp. 2992-3004 Dec. 2007.

Bub, G. et al., "Temporal pixel multiplexing for simultaneous high-speed high-resolution imaging," Nature Methods, vol. 7, No. 3, pp. 208-211, Mar. 2010.

Candes, E. et al., "Near-Optimal Signal Recovery From Random Projections: Universal Encoding Strategies?" IEEE Trans. Inf. Theory vol. 52, pp. 5406-5424, Dec. 2006.

Candes, E., et al., "Signal Recovery from Random Projections," Proc. SPIE, vol. 5674, pp. 76-86, Jan. 2005.

Dickinson, A., et al, "A 256×256 CMOS Active Pixel Image Sensor with Motion Detection" IEEE International Solid State Circuits Conference, Digest of Technical Papers, pp. 226-227, Feb. 1995.

Donoho, David L., "Compressed Sensing," IEEE Trans. Inf. Theory, vol. 52, No. 4, pp. 1289-1306 Apr. 2006.

Fernandez-Cull, Christy et al., "On-chip Temporal Multiplexing with a Digital-pixel Focal Plane Array", Presentation at the SPIE Defense, Sensing, and Security Conference, pp. 1-22, Baltimore, MD, May 2, 2013.

Fernandez-Cull, Christy et al., "Simultaneous Dynamic Pupil Coding with On-chip Coded Aperture Temporal Imaging", Appendix B, OSA Signal Recovery and Synthesis, pp. 58-60, Jul. 2014.

Fernandez-Cull, Christy et al., "Smart Pixel Imaging with Computational Arrays (SPICA)", Presentation at SPIE Defense, Sensing, and Security, pp. 1-40, Baltimore, MD, May 8, 2014.

Fernandez-Cull, Christy et al., "Smart Pixel Imaging with Computational-imaging Arrays", Proc. of SPIE, Jul. 1, 2014, vol. 9070, downloaded from http://proceedings.spiedigitallibrary.org. on Jan. 9, 2015, pp. D1-D13.

Fowler, B., et al., "A CMOS Area Image Sensor with Pixel Level A/D Conversion," Information Systems Laboratory, Electrical Engineering Dept., Stanford University, Stanford, CA., Session No. TP 13.5, pp. 1-11, Jun. 21, 2001.

Giacomini, J.D., "High-Performance ADCs Require Dynamic Testing," Application Note AD-02, National Semiconductor Corporation, pp. 1-14, Aug. 1992.

Goda, K., et al., Serial time-encoded amplified imaging for real-time observation of fast dynamic phenomena, Nature: Letters, vol. 458, pp. 1145-1149, Apr. 30, 2009.

Hamilton, Shepard, R. et al., "Optical Design and Characterization of an Advanced Computational Imaging System," Proc. of SPIE, 2014, vol. 9216, downloaded from http://proceedings.spiedigitallibrary.org on Jan. 9, 2015, pp. A1-A15.

International Search Report and Written Opinion dated Sep. 30, 2015 from International Application No. PCT/US15/38847, 7 pages.

(56) References Cited

OTHER PUBLICATIONS

Kelly, M. et al., "The Digital Focal Plane Array (DFPA) Architecture for Data Processing" "On-Chip" MSS Detectors, pp. 1-9, Feb. 2007.

Kleinfelder, S., et al., "Focal plane array readout integrated circuit with per-pixel analog-to-digital and digital-to-analog conversion," Proceedings of SPIE, vol. 4028, pp. 139-147, (2000).

Kozlowski, L. J., et al., "Progress toward high-performance infrared imaging systems-on-a-chip," Proceedings of SPIE, vol. 4130, pp. 245-253, (2000).

Little, Jeffrey W. et al., "Digital pixel CMOS focal plane array with on-chip multiply accumulate units for low-latency image processing", Proc. of SPIE, 2014, vol. 9070, downloaded from http://proceedings.spiedigitallibrary.org on Jan. 9, 2015, pp. B1-B8.

Llull, Patrick, et al., "Coded aperture compressive temporal imaging", Optics Express, vol. 21, pp. 10526-10545, May 6, 2013.

Mandl, W., "Advances in on Focal Plane A/D With Low Power Optical Readout", SPIE Proceedings vol. 3379, pp. 473-482, Apr. 1998.

McIlrath, Lisa G., "A Low-Power Low Noise Ultrawide-Dynamic-Range CMOS Imager with Pixel-Parallel A/D Conversion," IEEE Symposium on VLSI Circuits, Digest of Technical Papers, pp. 24-27, 2000.

Neifeld, M.A., et al. "Feature-specific imaging," Applied Optics, vol. 42, Issue 17, pp. 3379-3389 Jun. 10, 2003.

Neifeld, M.A., et al., "Optical architectures for compressive imaging," Applied Optics, vol. 46, Issue 22, pp. 5293-5303 Aug. 1, 2007.

Notice of Allowance dated Apr. 18, 2017 from U.S. Appl. No. 14/789,601, 13 pages.

Raskar, R. et al., "Coded Exposure Photography: Motion Deblurring using Fluttered Shutter," Proc. IEEE Computer Society Conference Computer Vision Pattern Recognition, pp. 1-10, 2007.

Reddy, D. et al. "P2C2: Programmable Pixel Compressive Camera for High Speed Imaging," In CVPR pp. 329-336, Jun. 20, 2011.

Schultz, K. et al., "Digital-Pixel Focal Plane Array Technology," Lincoln Laboratory Journal, vol. 20, No. 2, Aug. 2014, pp. 36-51.

Shi, Boxin, et al., "Sub-pixel Layout for Super-Resolution with Images in the Octic Group," ECCV, Part 1, LNCS 8689, pp. 250-264, 2014.

Tyrrell, B., et al., "Time Delay Integration and In-Pixel Spatiotemporal Filtering Using a Nanoscale Digital CMOS Focal Plane Readout," IEEE Transactions on Electron Devices, vol. 56, No. 11, pp. 2516-2523, Nov. 2009.

Tyrrell, Brian, On-Focal-Plane-Array Digital Computation presentation, Lincoln Laboratory, MIT, pp. 1-11, Dec. 2, 2014.

\* cited by examiner

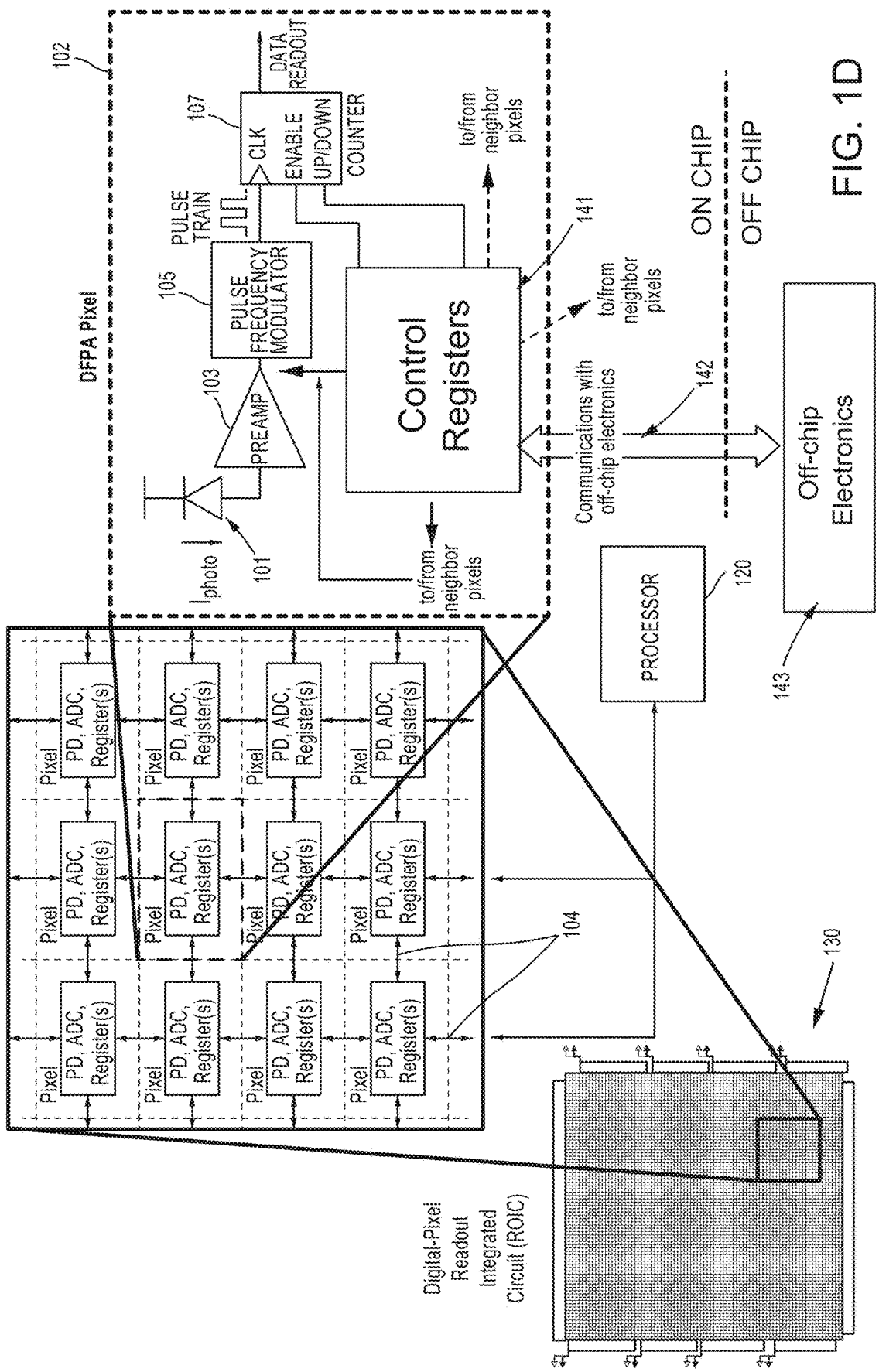

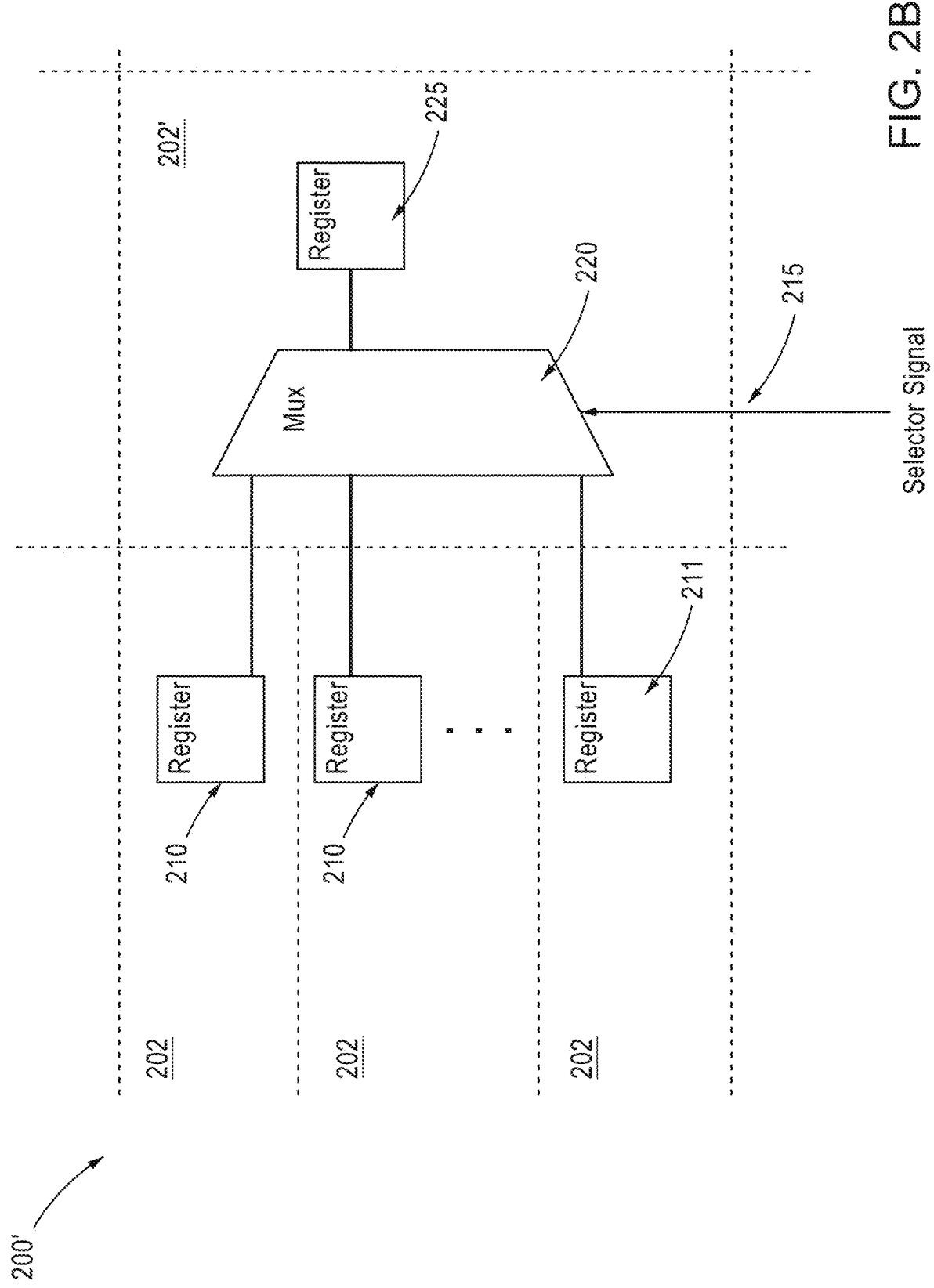

Mask Correlation

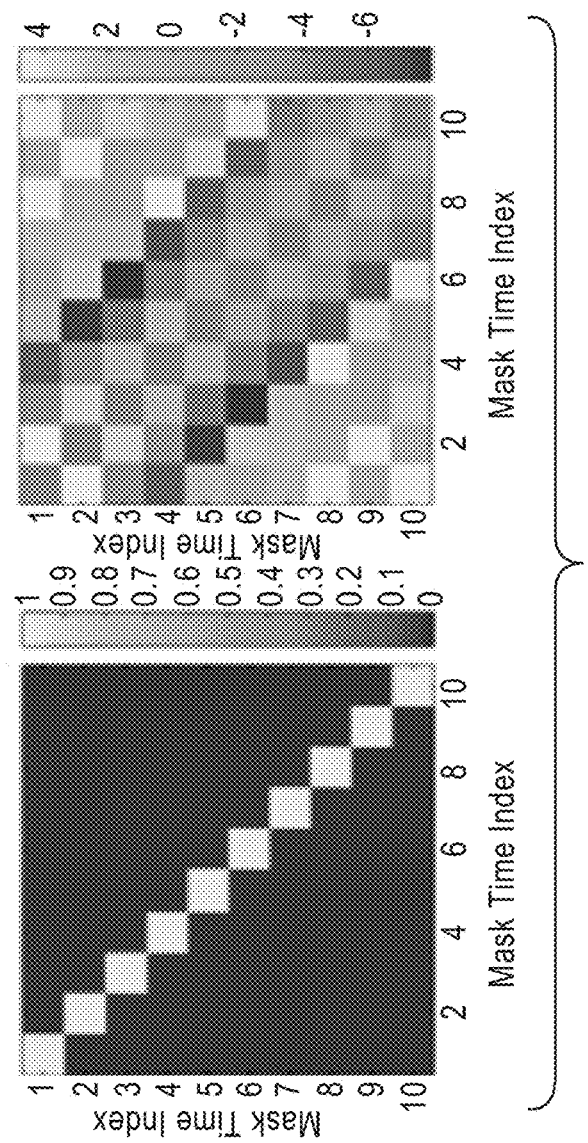
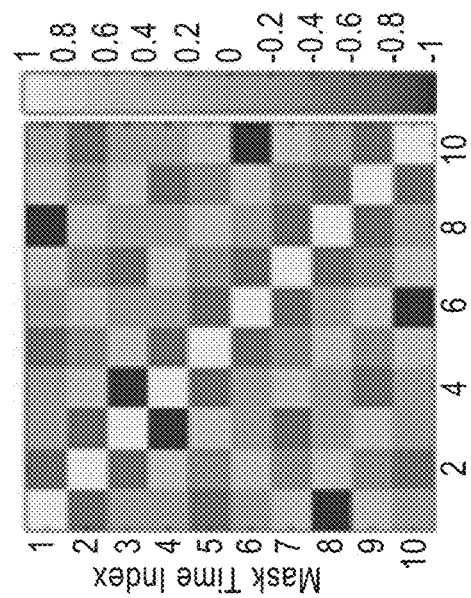
FIG. 13H
FIG. 13G
FIG. 13F

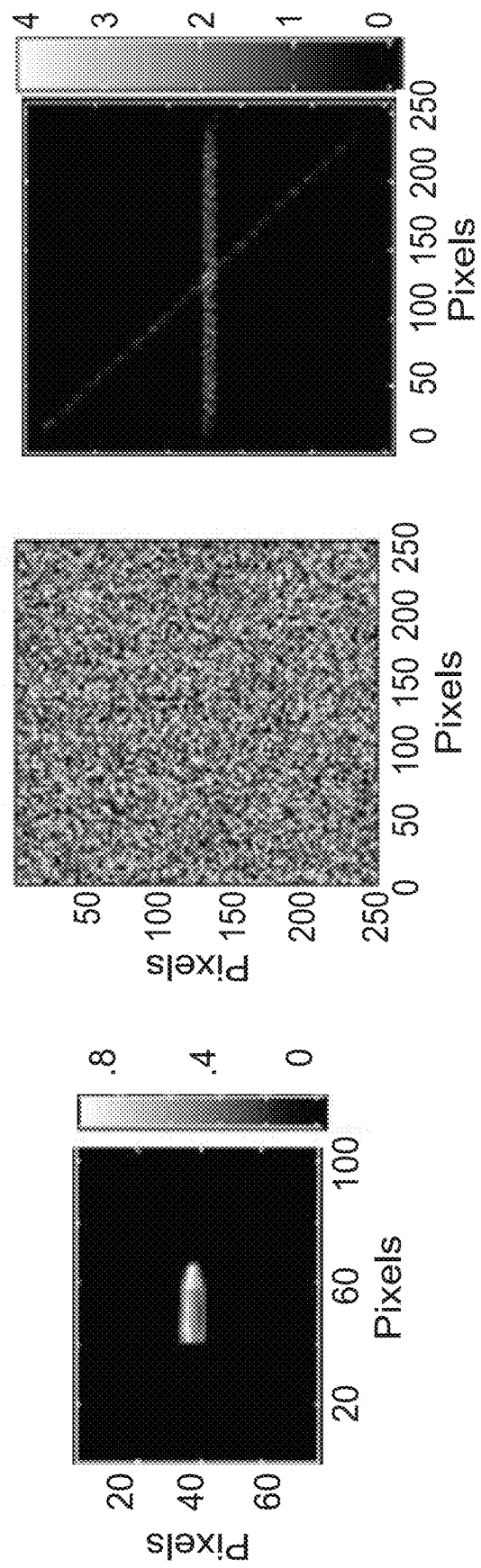

Apply context-relevant signal processing within each group

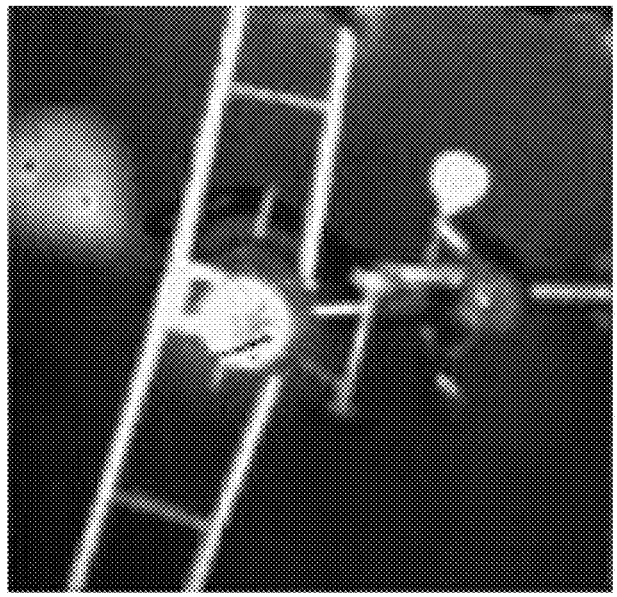
FIG. 18C
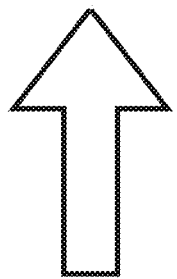
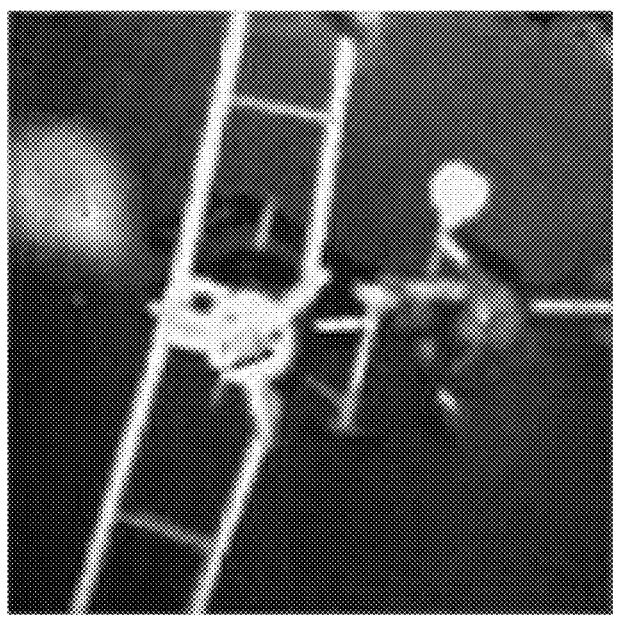
FIG. 18B
Apply context-relevant signal processing within each group

METHOD AND APPARATUS FOR ON-CHIP PER-PIXEL PSEUDO-RANDOM TIME CODED EXPOSURE

CROSS-REFERENCE TO RELATED APPLICATIONS

This application is a continuation of U.S. application Ser. No. 15/678,439, now U.S. Pat. No. 10,250,831, which was filed on Aug. 16, 2017, as a continuation of U.S. application Ser. No. 14/789,601, now U.S. Pat. No. 9,743,024, which was filed on Jul. 1, 2015. Each of these applications is incorporated herein by reference in its entirety.

GOVERNMENT SUPPORT

This invention was made with government support under Contract No. FA8721-05-0002 awarded by the U.S. Air Force. The government has certain rights in the invention.

BACKGROUND

Focal plane arrays (FPAs) are two-dimensional arrays of photodetectors disposed in the focal plane of a lens for applications such as imaging, spectrometry, lidar, and wavefront sensing. Conventional FPAs typically provide analog readout, with the analog signals generated at the pixel level converted to digital signals by analog-to-digital converters (ADCs) that are external to the FPA. The converted signals can then be processed according to the demands of a particular application. Specific analog designs can target, and possibly achieve, one or more design requirements, but fail when simultaneously targeting the most aggressive design parameters for imaging applications, such as transient target imaging and wide-area surveillance.

Wide-area imaging with commercial off-the-shelf (COTS) FPA detectors trade frame rate for spatial resolution. As a result, fast moving targets are recorded as streaks moving across a field-of-view. These two-dimensional (2D) streaked images lack temporal history and provide degraded spatial images. Conventional digital-pixel focal plane arrays ("DFPAs") have on-chip global capability for single transient-feature extraction in a snapshot, but are not capable of multi-target and multi-frequency discrimination. Persistent and wide-area surveillance applications can therefore benefit from techniques that enable search and track of fleeting targets while maintaining a wide field-of-view.

SUMMARY

Embodiments of the present disclosure include a focal plane imaging apparatus and method for on-chip per-pixel space-time modulation. An example focal plane imaging apparatus includes: (1) a plurality of photodetectors, with a first photodetector to convert a first portion of light that is scattered and/or reflected from a scene into a first analog signal and a second photodetector to convert a second portion of light that is scattered and/or reflected from the scene into a second analog signal; (2) a plurality of analog to digital converters (ADCs) with a first ADC electrically coupled to the first photodetector and configured to convert the first analog signal into a first digital signal, and a second ADC electrically coupled to the second photodetector and configured to convert the second analog signal into a second digital signal; (3) a plurality of digital registers with a first digital register electrically coupled to the first ADC and configured to store a first digital number representing the first digital signal, and a second digital register electrically coupled to the second ADC and configured to store a second digital number representing the second digital signal; and (4) a distributed control pattern generator operably coupled to the plurality of ADCs and/or the plurality of digital registers and configured to modulate, at a rate faster than a readout rate of the plurality of digital registers, storage of the first digital number with a first pseudo-random modulation and to modulate, at a rate faster than a readout rate of the plurality of digital registers, storage of the second digital number with a second pseudo-random modulation so as to control spatial correlation of the first digital number with the second digital number.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 1D shows a focal plane imaging apparatus, including photodetectors, ADCs, digital registers, and one or more control registers in communication with off-chip electronics, according to some embodiments.

FIG. 2B is a schematic illustration of the distributed control pattern generator of FIG. 2A, according to some embodiments.

FIG. 13F is a space-time per-pixel modulation correlation matrix for encoding using four pixel groups, according to some embodiments.

FIGS. 13G and 13H are space-time per-pixel modulation correlation matrices for distributed LFSR modulation (at two different scales), according to some embodiments.

FIG. 16A is a spatially extended baseline image of three transient targets (bullets), according to some embodiments.

FIG. 16B is an example frame of a spatially randomized temporally modulated coded aperture used for imaging the baseline image of FIG. 16A.

FIG. 16C is a modulated pixel output image of the three transient targets of FIG. 16A, taken at a base frame rate.

FIGS. 18B and 18C are image frames created using context-relevant signal processing within each group shown in FIG. 18A.

DETAILED DESCRIPTION

Figure 1A:
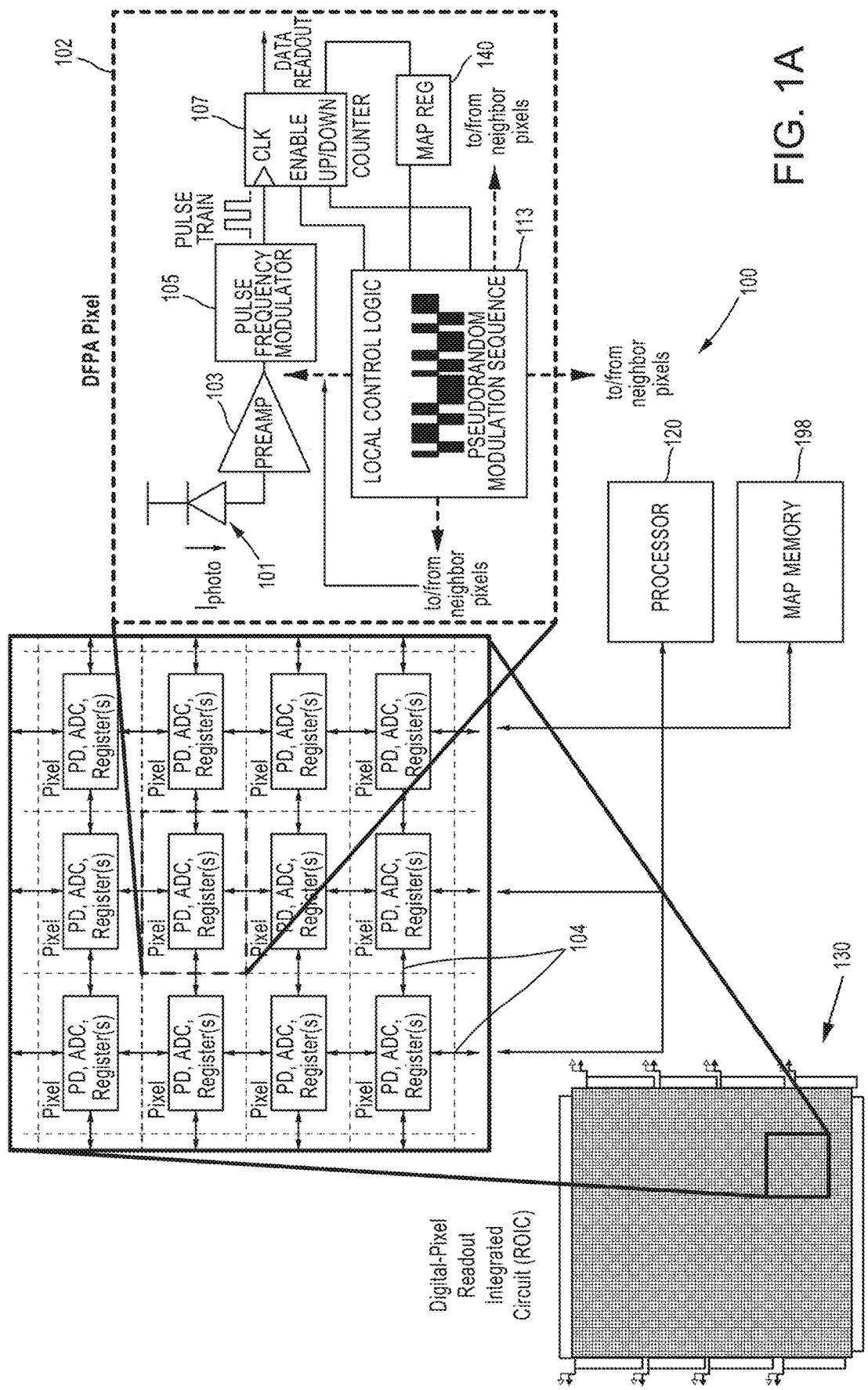
FIG. 1A shows a focal plane imaging apparatus, including a plurality of photodetectors, a plurality of analog-to-digital converters (ADCs), a plurality of digital registers, and circuitry for in-pixel modulation, according to some embodiments.

"Transient target imaging" refers to imaging of fast-moving and/or fast-changing subjects such as projectiles. Existing transient target imaging using commercial off-the-shelf ("COTS") detectors imposes a trade-off between resolution and frame rate, particularly when imaging a large area. Transient targets moving faster than the detector frame rate manifest themselves as streaks or "blurring" when detected by slow-speed detectors. Temporal space-time filtering operations have previously been implemented via active optical image plane coding in the fields of computational imaging, compressive sensing, and coded-aperture imaging. But active illumination in such contexts involves structured illumination employing mechanical shutters such as digital micro-mirror devices ("DMDs"). Challenges associated with mechanical shutters along the optical axis include speed limitations for in-pixel binary operations, reflectivity losses at the DMD array, mechanical repeatability of the actuators over time, and inherent light loss due to a 1,0 mask realization. Other approaches, e.g., in the computer vision community, use a random pixel-based coding strategy with a high frame-rate amplitude modulator affecting polarization of the incident light (e.g., Liquid Crystal on Silicon—LCOS). Imagers using digital-pixel focal plane arrays ("DFPAs") have on-chip global pixel operation capability for extracting a single transient-feature (e.g., single-frequency discrimination) in a snapshot that depends on the number of counters implemented per pixel. However, these DFPA systems are generally not capable of multi-target and multi-frequency discrimination.

Embodiments of the present disclosure extend DFPA technology to support on-chip temporal discrimination of diverse and dynamic targets orders of magnitude faster than the readout frame rate, thereby overcoming the conventional tradeoff between resolution and frame rate. On-chip per-pixel space-time modulation is applied to a DFPA architecture to achieve multi-target transient signature discrimination, or "temporal super-resolution." A hardware in-pixel approach (a per-pixel shutter instead of a global shutter) is employed, which overcomes the limitations associated with mechanical apertures and allows for aperiodic and periodic multi-target transient feature discrimination of resolved and unresolved targets. A pixel circuit receives input photocurrent from a photodetector, and using an analog-to-digital converter, creates a digital number of that photocurrent in a digital register. A per-pixel temporal filter (e.g., electronic shutter) is used instead of a global filtering operation across the array.

In some embodiments, a time-encoded streak is embedded in the image such that, when coupled with a known time-encoded modulation, the transient signature can be recovered from the image with novel image processing techniques. The modulation scheme at the image plane employs a binary (+1, −1), per-pixel encoding and thus is "passive"—it has no moving parts or loss in flux from the target (i.e., there is no need for a shuttering aperture to be placed along the optical axis). In a dual-counter pixel, encoding can be selectively applied to a single counter, while preserving a pristine raw integrated image in the other counter. In subsequent off-chip processing, reconstruction algorithms using compressive sensing techniques (e.g., total variation regularization) can be applied to estimate a three-dimensional ("3D") (x,y,t) data cube, in which a single readout frame provides many sub-frame time slices. In this case, the three dimensions, "(x,y,t)," are two spatial dimensions (e.g., "x" and "y" or "r" and "θ") and time "t."

Embodiments of on-chip, per-pixel modulation described herein can provide numerous advantages. For example, the on-chip capability for temporal modulation faster than the detector readout frame rate mitigates temporal registration issues, thereby reducing the temporal blurring in the image. The on-chip capability also enables background suppression during low-signal transient target tracking and discrimination by isolating background frequencies from signal frequencies using per-pixel pseudorandom demodulation approaches. Additionally, combining a time-averaged series of per-pixel modulation and nonlinear signal inversion results in improved transient feature extraction for resolved and unresolved targets. Focal plane imaging apparatuses described herein can support low-latency closed-loop operation, reduce the raw data volume, support high resolution over a wide field of view, and allow high-rate multiframe averaging. Focal plane imaging apparatuses described herein are suitable for use in many applications, including image segmentation for active contour-based tracking, local correlation tracking, optical flow measurement, observation of local temporal features, local clutter rejection, and rotational motion compensation.

Implementation of Focal Plane Imaging Apparatus

For the examples which follow, a pseudorandom modulation sequence is used to modulate the pixel, but other forms of spatially and temporally varying modulation can be applied using the same techniques. For example, a structured modulation pattern containing a plurality of spatial or temporal frequency components could be used in lieu of a pseudorandom pattern.

FIG. 1A shows a block diagram of an exemplary focal plane imaging apparatus 100 that includes an off-chip processor 120 coupled to a digital read-out integrated circuit (DROIC) 130. The focal plane imaging apparatus 100 may also be referred to as a compressive imaging apparatus (CIA) because it leverages space-time logic at the local and global pixel level for transient target imaging as described in greater detail below. The focal plane imaging apparatus 100 provides in-pixel local and global shuttering as well as compressive temporal imaging that enables full 3D data-cube estimation from a single temporally-encoded 2D object projection. Compressive sensing algorithms enable sampling below the Nyquist rate for adequate signal recovery when the target sparsity matrix and the random projection matrix satisfy the restricted isometry property (RIP). In theory, RIP can be derived for a wide variety of implementation matrices, but in practice the metric of choice is a measure of incoherence between the measurement matrix and object sparsity transformation matrix. Thus, the focal plane imaging apparatus 100 combines the strengths associated with signal recovery from sub-Nyquist measurements and novel DROIC design for temporal super-resolution.

The DROIC 130 comprises three main functional blocks: an analog front end, a pixel digital back end and the readout circuitry. These functional blocks are implemented in an array of pixels 102 connected to one another via control/transfer lines 104. As illustrated in FIG. 1I, the control/transfer lines 104 may be an interconnection network 104a between in-pixel control pattern generation circuitry 199 thus forming a distributed control pattern generation circuit, or the control/transfer lines may be other connections 104b that serve other purposes. Each pixel 102 includes a respective photodetector 101, a respective pre-amplifier 103, a respective analog-to-digital converter ("ADC") 105 (e.g., a pulse frequency converter), one or more respective digital registers 107 (e.g., a counter, a bidirectional counter, a negate counter, etc.), and local control logic 113 that forms part of a distributed control pattern generation circuit that generates a pseudorandom modulation sequence. This modulation sequence can be operably coupled to either the transduction or the digitization process. For the apparatus 100 illustrated in FIG. 1A, the modulation is coupled through an interface with the counter 107 through control of an enable pin and count direction selection pin. In alternate embodiments, the local control logic 113 could be coupled to other pixel circuit components, such as the pulse frequency modulator 105, preamplifier 103, or photodiode 101, to achieve a similar effect. As shown in FIG. 1A, the local control logic 113 can also be operably coupled to other pixels 102 (e.g., neighboring pixels, optionally in one or more orthogonal directions within the array) in the DROIC, e.g., to receive configuration information via an on-chip distributed control pattern generator (discussed further below). As shown in FIG. 1A, the focal plane imaging apparatus 100 may also include a map register 140 that can be implemented within the pixel and either populated with data generated on-chip (i.e., on the DROIC 130) or from data originating from either off chip or from the periphery, e.g. from an off-chip map memory 198.

The photodetectors 101 can be fabricated as a separate array (not shown) that is hybridized or otherwise coupled to the DROIC 130. For example, the photodetectors 101 may be implemented as a commercial-off-the-shelf (COTS) longwave infrared (LWIR) InGaAs detector array that is hybridized to a 256×256 pixel DROIC with a 30 μm pixel pitch via indium bump bonding. The photodetector array can also be implemented as a short-wave infrared (SWIR) InGaAs camera capable of supporting a 1 kHz global frame rate and a 100 MHz on-chip per-pixel shutter rate for time-varying, pseudo-random, binary-valued pixel modulation.

The photodetectors 101 can also be implemented as detectors sensitive to visible light. For instance, the photodetectors 101 can be formed as a 32×32 detector array with a 30-μm pixel pitch. For a photodiode active area of 2.17 μm2, the pixel fill is factor of about 0.24 percent. This photodiode array can be mounted in a 120-pin pin-grid array (PGA) package and wire bonded to a DROIC 130 fabricated using 45 nm IBM silicon-on-insulator (SOI) technology to yield an apparatus 100 capable of a 6 kHz global frame rate and a 50 MHz on-chip global shutter rate.

In operation, each photodetector 101 converts incident photons, which may be scattered and/or reflected from a scene, into an analog signal (e.g., a photocurrent), thereby generating an analog representation of the incident light. Depending on the specific implementation, the photodetectors 101 may be configured to sense visible light, short-wave infrared (SWIR) light, or long-wave infrared light (LWIR). Alternatively, the photodetectors 101 may be replaced by or augmented with another type of imaging array, such as a bolometer, Terahertz imaging array, or acoustic sensor array, to sense radiation at wavelengths/energies outside the optical band.

The output of each photodetector 101 is coupled to an optional preamplifier 103, which amplifies the analog signal prior to analog-to-digital conversion. The preamplifier stages 103 depicted in FIG. 1A are not necessary, but yield improved sensitivity in the SWIR region of the electromagnetic spectrum. The preamplifier stages 103 can yield a lower least-significant-bit of tens of electrons, depending on the gain mode setting, which reduces the quantization noise for SWIR imaging and other applications.

Each preamplifier 103 is electrically coupled to a corresponding ADC 105, which converts the pre-amplified analog signal from the preamplifier 103 into a digital signal that represents the photocurrent or other analog signal generated by the photodetector 101 due to incident light). Each ADC 105 can be implemented as a sigma-delta ADC that converts the pre-amplified analog signal, such as a current or voltage, into a stream of output pulses proportional to the amplitude of the pre-amplified analog signal (e.g., input photocurrent) as well understood in the art. For instance, the ADC 105 may be a sigma-delta ADC capable of recording up to 28 bits of in-pixel digital output. Other ADC implementations are also possible.

Each digital register/counter 107 is electrically coupled to a corresponding ADC 105 and stores a respective digital number representing the digital signal received from the corresponding ADC 105. For instance, the counter 107 may count the pulses in the pulse stream emitted by a sigma-delta ADC. As shown in FIG. 1A, each counter 107 includes a clock pin, an enable pin, and a counter direction ("UP/DOWN") pin. The local control logic 113 may modulate the count (digital number) stored in the counter 107 by applying an appropriate signal to the clock pin, enable pin, and/or counter direction pin.

In some configurations, each pixel 102 may include multiple digital registers. For example, a given pixel 102 may include two digital registers, each of which is operably coupled to the output of the corresponding ADC 105. The first digital register may collect the modulated image data, as in FIG. 1A, and the second digital register may collect an unmodulated image of the scene. This makes it possible to collect both a raw image and a processed image simultaneously using on-chip components.

Alternatively, or in addition, each pixel 102 in the DROIC 130 may include multiple counters. For example, the DROIC 130 may include eight 8-bit counters per pixel, each of which can operate at a different integration time set by the local control logic 113 or processor 120. These integration times may be independent of each other or linked, e.g., in a specific ratio, and may be up to the detector readout period (reciprocal of the detector readout rate), thereby allowing the user to leverage on-chip global temporal multiplexing capabilities.

Figure 1B:
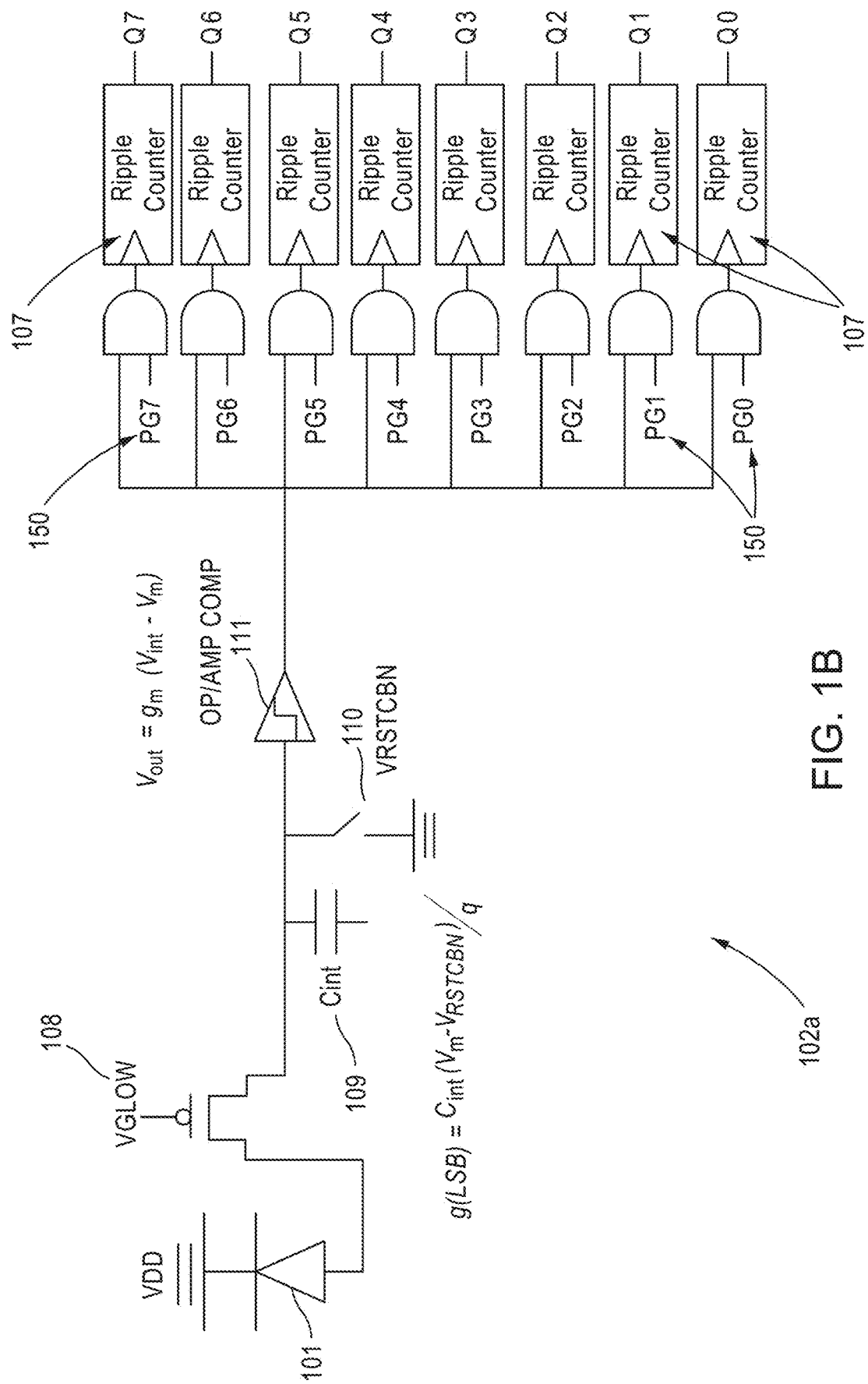
FIG. 1B is a schematic showing a pixel circuit having multiple counters, suitable for use in the focal plane imaging apparatus of FIG. 1A.

FIG. 1B shows a schematic of a pixel 102a including a photodiode 101 (electrically connected to positive power supply voltage $V_{DD}$), a MOSFET 108 (electrically connected/biased to voltage $V_{GLOW}$ to bias the photodetector, an integration capacitor 109, a reset switch 110 (electrically connected to a comparator circuit reset voltage $V_{RSTCBN}$), and an operational amplifier ("OP/AMP") comparator 111 having a transfer function $V_{out}=g_m(V_{int}-V_m)$. As shown in FIG. 1B, rather than a single counter, as shown in pixel 102 of FIG. 1A, pixel 102a includes eight independent counters 107 (though other quantities of counters per pixel are also contemplated), each controlled by a respective enable signal (collectively, enable signals 150). Each enable signal 150 may be driven by its own independent modulation pattern, thus allowing for recording of multiple independent temporally encoded values. As shown in FIG. 1B, each of the multiple counters includes its own respective control gate and associated logic. The AND gates shown implementing the enables may be any gating logic. The various approaches to modulating counters described elsewhere in this document can be applied to each of the individual counters shown in FIG. 1B. So, for example, instead of an enable for each counter as shown here, an up/down count direction select for each counter can be used.

Figure 1C:
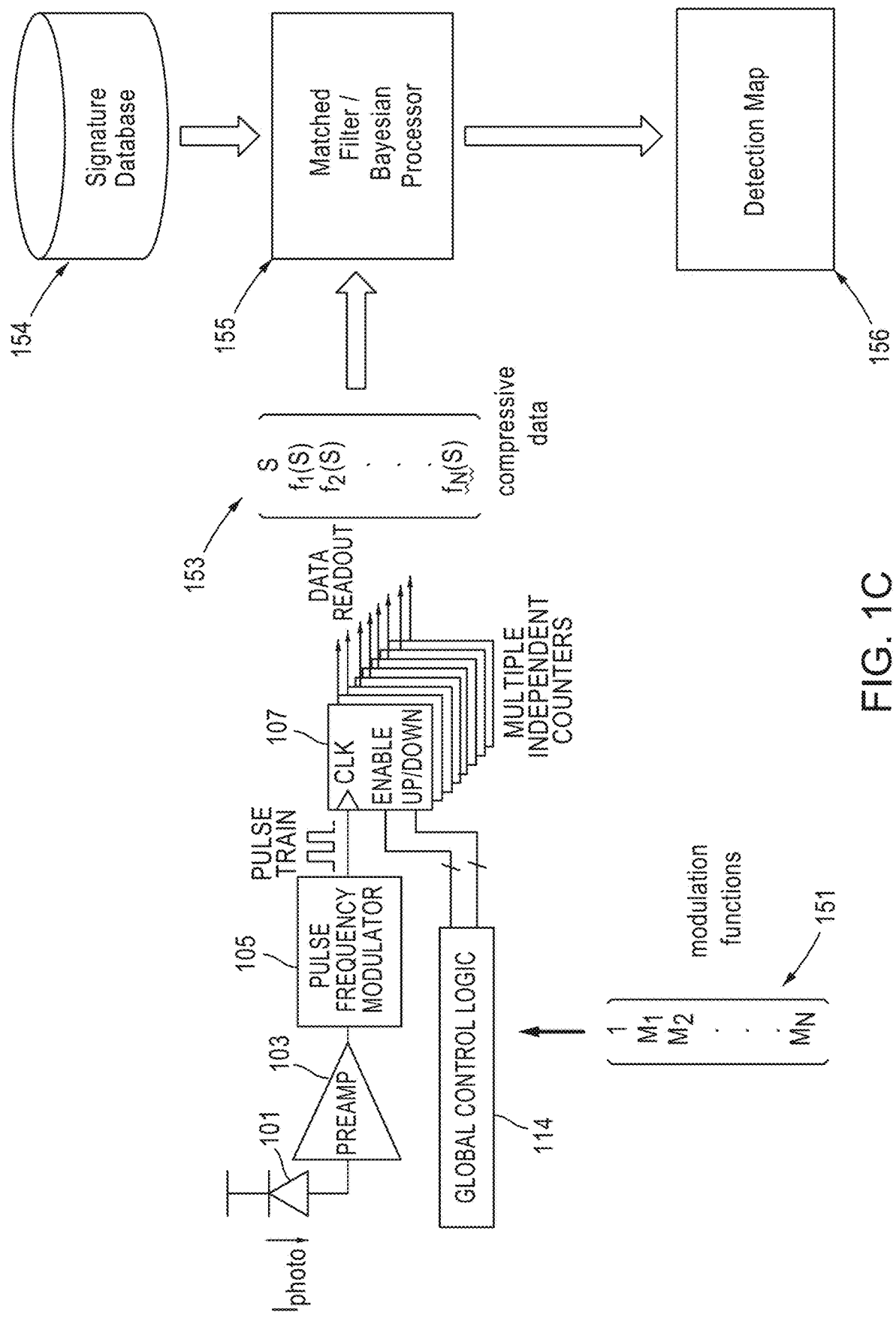
FIG. 1C is a diagram showing the generation and storage of a compressive data set for a pixel having a set of multiple counters, suitable for use in the focal plane imaging apparatus of FIG. 1A.

FIG. 1C shows an embodiment in which multiple in-pixel counters 107 record the results of modulating the input detected signal using multiple modulation functions 151 (which may represent the modulation of enable signals 150, discussed with reference to FIG. 1B) via global control logic 114. This generates a set of compressive data 153 in each pixel's set of counters. This data may be used by a matched filter or Bayesian processor 155 to generate a detection map 156 indicating those parts of the scene with high or low correlation to signatures in a library of signatures stored in a database 154. In some embodiments, signatures in the library of signatures of database 154 are derived in such a way as to correspond to the control patterns generated by the distributed control pattern generator (which, for example, can include local control logic, such as that shown in FIG. 1A at 113). In some embodiments, the Bayesian processor 155 and the database 154 are functionally part of a processor block (e.g., processor 120 of FIG. 1A). The processor can be off-chip, on-chip, or partially on and off-chip.

FIG. 1A also shows that each pixel 102 includes local control logic 113 that is operably coupled to the ADC 105 and/or the digital register 107 in the same pixel 102. The in-pixel local control logic 113 can also be operably coupled to one or more neighboring pixels within the DROIC 130, as part of a distributed control pattern generator circuit, discussed further below. The in-pixel local control logic 113 enables a pseudo-random pixel code to be pre-loaded at the pixel level and temporally regrouped and negated. In operation, the local control logic 113 modulates the digital register(s) 107 in the same pixel with the pseudo-random pixel code, also called an aperture code or shutter code, at a rate faster than the readout rate of the digital register(s) 107. For instance, the local control logic 113 may apply the pseudo-random modulation to a given register's enable pin, count direction pin, clock pin, and/or mode selection bus. The pseudo-random modulation causes each register 107 to store a respective digital number that represents a pseudo-randomly modulated measure of the aggregate photon flux integrated during the register readout period.

Different registers 107 in the DROIC 130 may be modulated with different pseudo-random aperture codes in order to control the spatial correlation among the pixels 102 in the array. For example, the pseudo-random aperture codes may be selected or generated such that they are uncorrelated in order to facilitate the use of compressive sensing image processing techniques as described in greater detail below. The pseudo-random modulation can be generated by a temporal modulator that is coupled to the ADC 105 and/or the register 107, a value stored in memory (e.g., map register 140), or a configuration bit of the register 107. The pseudo-random modulation may also be based on a peripheral selection signal that originates outside of the DROIC 130 (e.g., a signal from the processor 120, a signal determined by a computer or other device which uses the resulting imagery, etc.).

In some cases, the pixels 102 may be divided into different groups, with a different pseudo-modulation applied to each group and the group assignments stored in the map register 140, which can be implemented as a 14-bit register. The pixels 102 can be assigned to groups pseudo-randomly via a linear shift feedback register (LFSR) using the least-significant bit and most-significant bit of the map register 140. Note that LFSRs can also be utilized to produce pseudo-random sequences for modulating the pixel registers 107. Each pixel register (bidirectional counter) 107 is then sent instructions indicating which groups to negate versus time to render a quasi-random, ideally uncorrelated space-time code.

If desired, pseudo-random pixel group assignments can be used for temporal multiplexing, employing a local 'flutter pixel', in the following manner with the focal plane imaging apparatus 100 shown in FIG. 1A. First, the pixels 102 are pseudo-randomly selected and assigned to separate groups (e.g., four separate groups) in memory, such that all of the pixels 102 are pseudo-randomly assigned to the different groups. Second, a binary-valued (e.g., −1,1) pseudo-random aperture code is loaded from memory. Third, during readout of a single detector, pre-selected groups are negated (i.e., multiplied by −1) T times. To ensure accurate data value interpretation by the data acquisition system, T may be an even number.

The processor 120 coupled to the DROIC 130 polls the registers 107 at a readout rate slower than the pseudo-random modulation rate (e.g., the readout rate may be on the order of kilohertz, whereas the pseudo-random modulation rate may be on the order of Megahertz). If each pixel includes multiple digital registers 107—e.g., one to collect the modulated image data and another one to collect an unmodulated image of the scene—the processor 120 may read data from one, some, or all of the registers 107 in each pixel 102.

The processor 120 processes the digital numbers read from the registers 107 based on the pseudo-random modulation applied to each pixel 102 or group of pixels 102 in the DROIC 130. For example, the processor 120 may discriminate at least one temporal frequency in the scene based on the pseudo-randomly modulated representation of the scene read from the registers 107. In some cases, the processor 120 applies a compressive sampling/sensing algorithm for calculating and outputting a reconstructed image of the scene based on a pseudo-random modulation and a stored cumulative value of each of the digital registers, as discussed below in the section titled "Compressive Sampling Algorithms and Transient Image Reconstruction."

Figure 9:
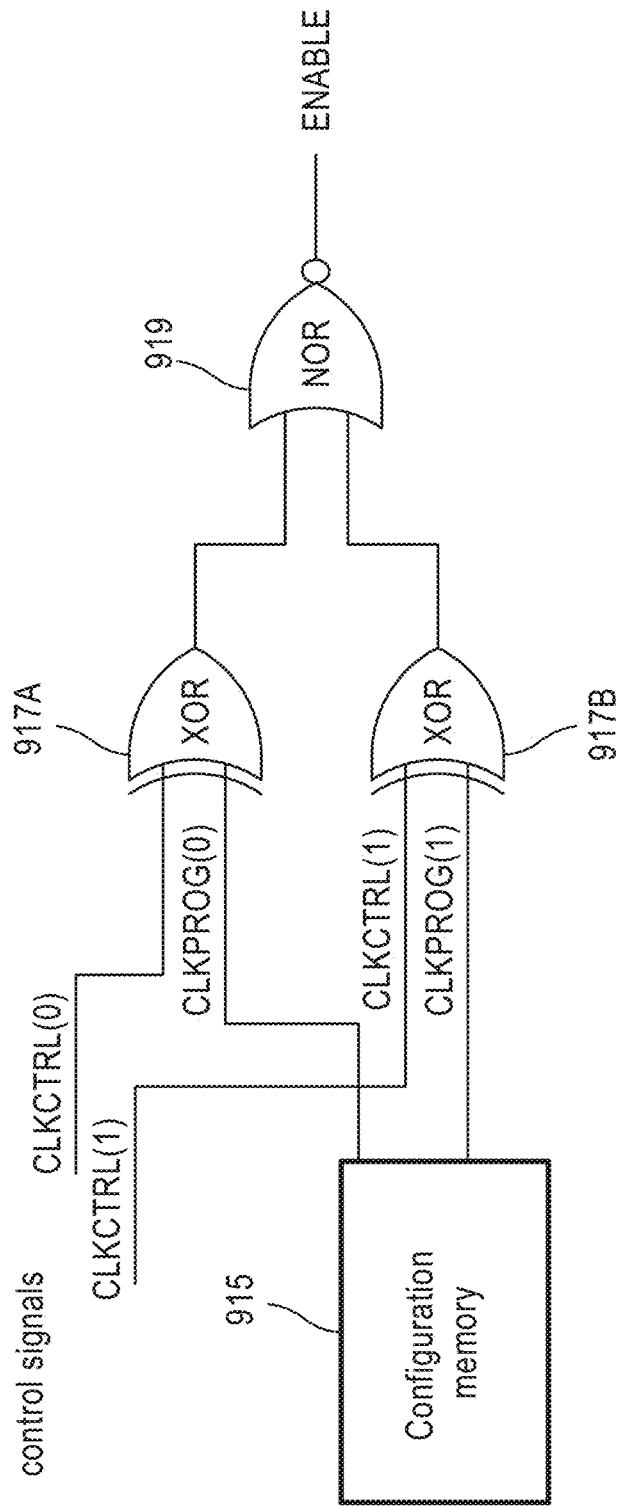
FIG. 9 is a schematic showing a digital logic circuit for two-bit pixel group assignment implementation suitable for use in the focal plane imaging apparatus of FIGS. 1A and 1D-1I.

The DROIC 130 can also be used to implement wide variety of digital logic functions (see, e.g., FIG. 9 and its corresponding description below). Under control of the processor 120, for example, the registers 107 and transfer lines 104 can implement a combination of logic gates (e.g., AND, OR, NOT, NAND, NOR, XOR, XNOR) by transferring data between registers 107 and incrementing and/or decrementing the counts in the registers 107 as desired. The processor 120 and/or the local control logic 113 can also implement logical operations on the digital number stored in the register 107 by incrementing, decrementing, or negating the digital number and/or shifting it to another register 107 in the same pixel 102 or a different pixel 102. These changes may be based on a previous digital number or a previous state of the corresponding digital register 107 and/or a group assignment of the register 107 issued by the electronic circuitry. The local control logic 113 may also set the register 107 to a new/subsequent register state based on the previous register state and/or the ADC 105 output. These data transfer, increment, decrement, and negate operations can be used to realize desired Boolean functions of one or more input signals. They can also be used to perform on-chip filtering, motion compensation, etc. of the detected image data.

FIG. 1D shows a digital pixel 102 in which one or more control registers 141 are operably coupled through an interface with counter 107. The control registers 141 may be part of a distributed control pattern generator, as discussed in further detail below. If the modulation signal is generated off-chip by off-chip electronics 143 and transferred to the control registers 141 via a communications read-in interface 142, then that modulation can be used to enable and disable the counter and to control its count direction. The modulation rate may be limited to the rate at which new register states can be transferred from the off-chip electronics via interface 142 to the one or more control registers 141.

Figure 11:
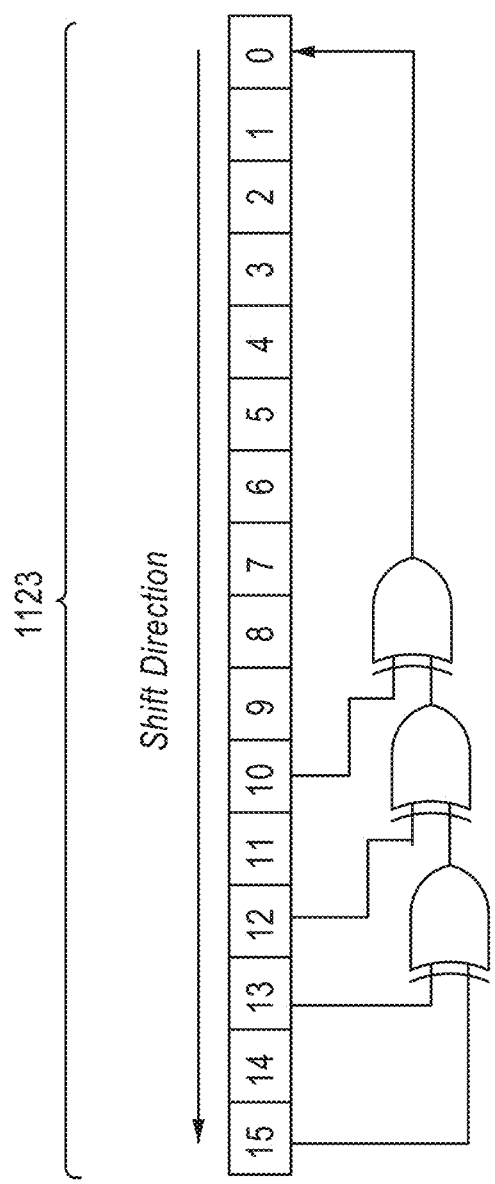
FIG. 11 is a schematic showing a LFSR as a pseudorandom number generator for pixel group assignments, according to some embodiments.

The off-chip electronics 143 may comprise a pseudorandom number generator, such as the linear feedback shift register illustrated in FIG. 11. As shown in FIG. 1D, the control registers 141 can also be operably coupled to other pixels 102 (e.g., neighboring pixels, optionally in one or more orthogonal directions within the array) in the DROIC 130, e.g., to receive configuration information via an on-chip distributed control pattern generator (discussed further below). The distributed control pattern generator comprises non-local circuitry that is distributed throughout the pixel array, utilizing local component logic blocks that reside within each pixel. The distributed control pattern generator may additionally rely on additional circuitry that resides at the periphery of the pixel array or off-chip.

Figure 1E:
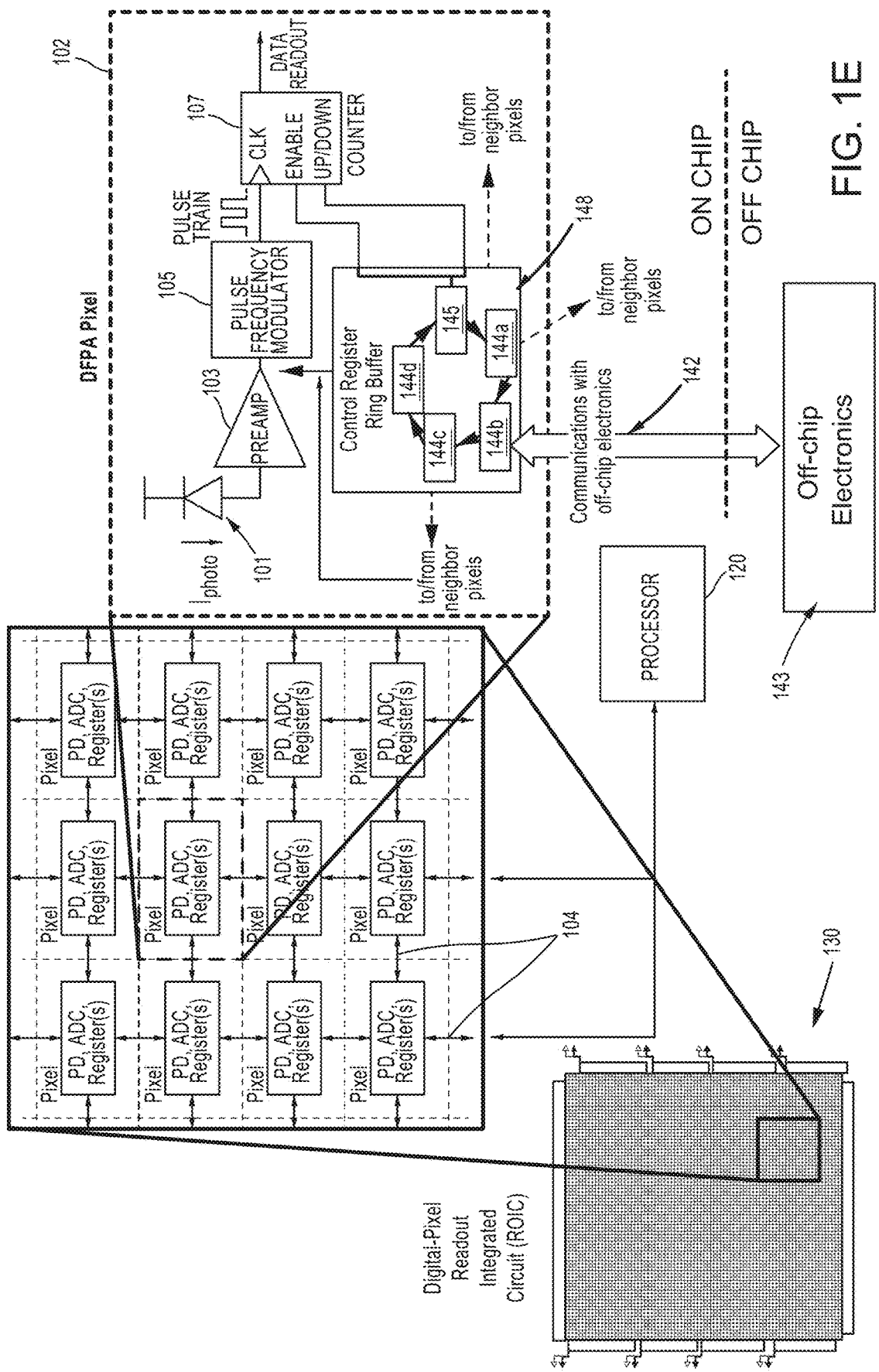
FIG. 1E shows a focal plane imaging apparatus, including photodetectors, ADCs, digital registers, and a control register ring buffer in communication with off-chip electronics, according to some embodiments.

A focal plane imaging apparatus may include additional local circuitry to impart a modulation that includes frequency information that can be faster than the rate at which data may be read onto the chip via interface 142. FIG. 1E shows an example embodiment in which the modulation data is transferred from the off-chip electronics 143 to a control register ring buffer 148. Within the ring buffer 148 are storage registers 144a-d and a control register 145. The control register 145 is operably coupled through an interface with the counter 107. Data within the ring buffer 148 may be advanced at a rate faster than the data read-in rate. However, the number of states in the pseudorandom sequence is limited by the number of available registers within the pixel, thus limiting the scalability of the implementation to tight pixel pitches. As shown in FIG. 1E, the control register ring buffer 148 can also be operably coupled to other pixels 102 (e.g., neighboring pixels, optionally in one or more orthogonal directions within the array) in the DROIC 130, e.g., to receive configuration information via an on-chip distributed control pattern generator (discussed further below).

Figure 1F:
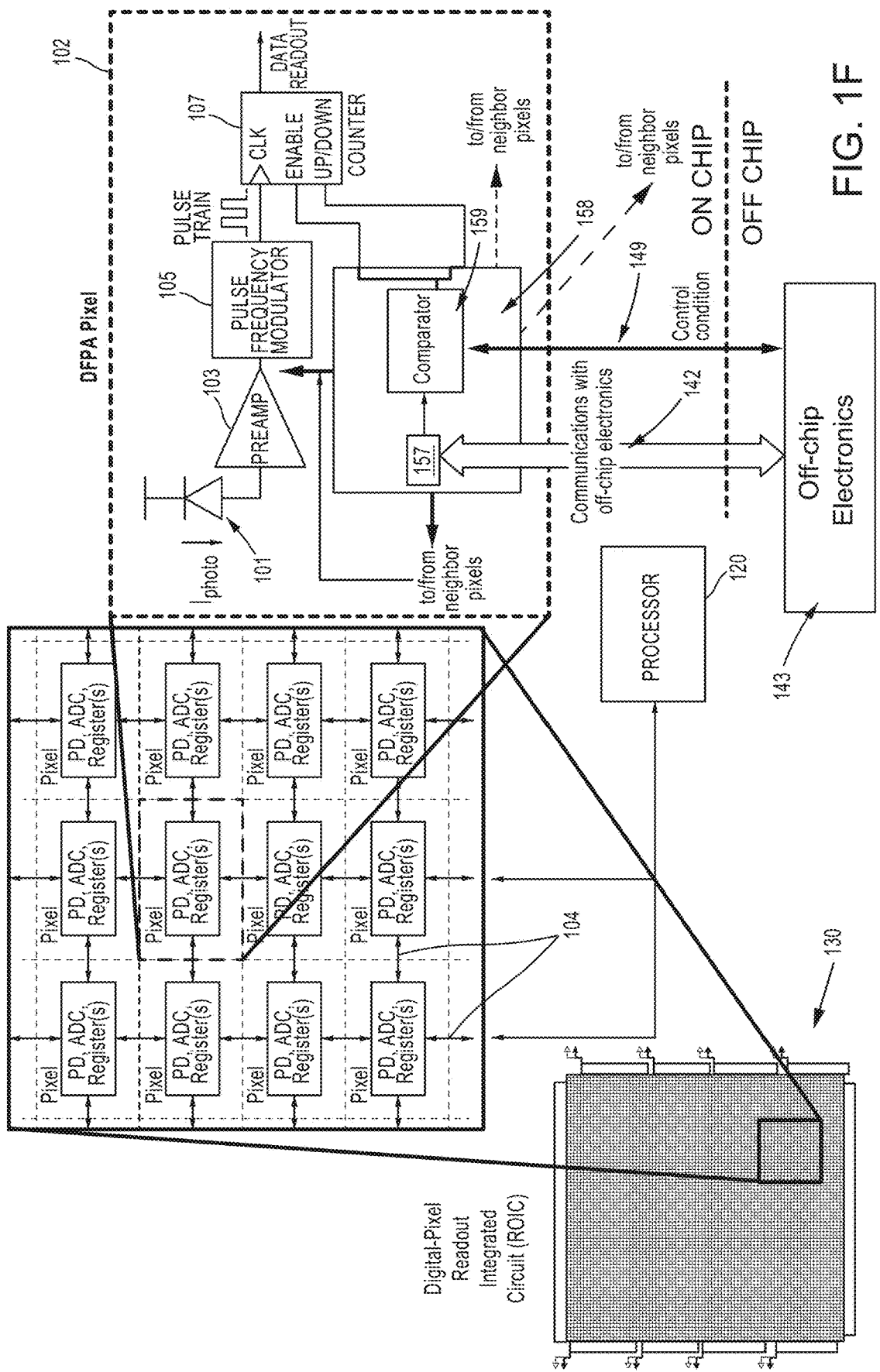
FIG. 1F shows a focal plane imaging apparatus, including photodetectors, ADCs), a plurality of digital registers, and a configuration register and comparator in communication with off-chip electronics, according to some embodiments.

In an alternate embodiment, illustrated in FIG. 1F, configuration data from the off-chip electronics 143 is transferred via a read-in interface 142 to a configuration register 157 that resides in local logic block 158. The configuration register 157 may have any number of configuration bits. A comparator 159 coupled to the configuration register 157 compares the configuration bit(s) to a control condition 149 that can be updated in real time by the control electronics 143 at a rate faster than the read-in frame rate. As shown in FIGS. 1F-1I, the local logic block 158 can also be operably coupled to local logic blocks 158 in other pixels 102 (e.g., neighboring pixels, optionally in one or more orthogonal directions within the array) in the DROIC 130, e.g., to receive configuration information via an on-chip distributed control pattern generator (discussed further below).

Figure 8:
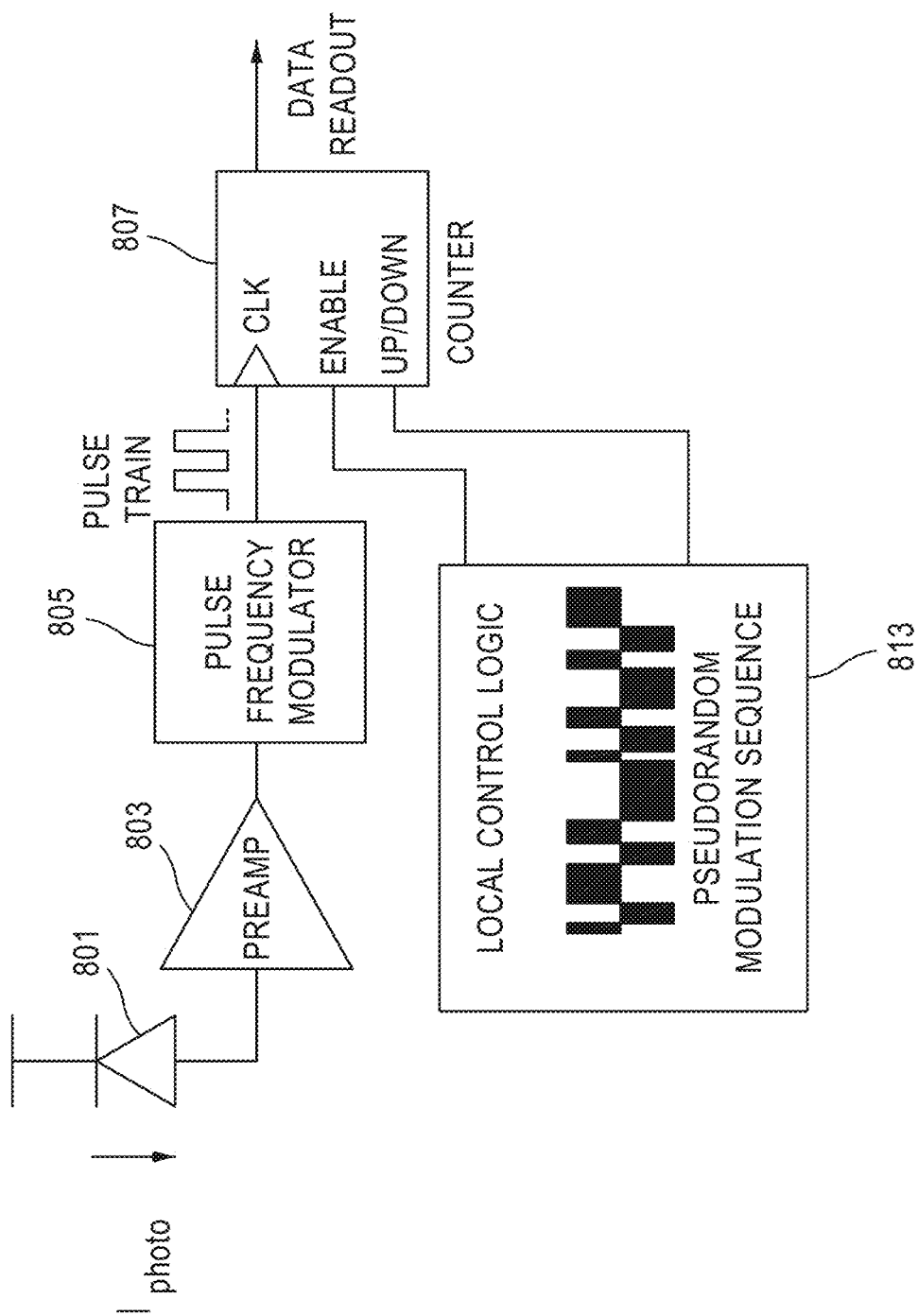
FIG. 8 is a schematic showing a pixel circuit with a preamplifier, a pulse frequency modulator, local control logic enabling a pseudorandom modulation sequence, and a bidirectional counter suitable for use in the focal plane imaging apparatus of FIGS. 1A and 1D-1I.

In some examples, the configuration register 157 assigns a pixel 102 to a group (e.g., a group of pixels with the same modulation pattern, or whose modulation will be changed in a common manner and/or concurrently), and the control condition is used to identify which pixel group is to have a particular setting. For example, as discussed further below, FIG. 8 illustrates an example of a two-bit comparator, in which the configuration memory 815 corresponds to the configuration register 3202. The number of pixel groups is given by two raised to the power of the number of configuration register bits. Thus for the example two-bit implementation, there are four available pixel groups.

The quality of achievable reconstruction of an acquired image can be improved by reducing the mask correlation between pixels (see, e.g., the discussion of FIGS. 13A through 13H below). One way to reduce mask correlation between pixels is to include a pseudorandom pattern generator in each pixel instead of applying modulation to pixel groups. One approach to implementing a pseudorandom pattern generator in each pixel is to use an LFSR in each pixel.

Figure 1G:
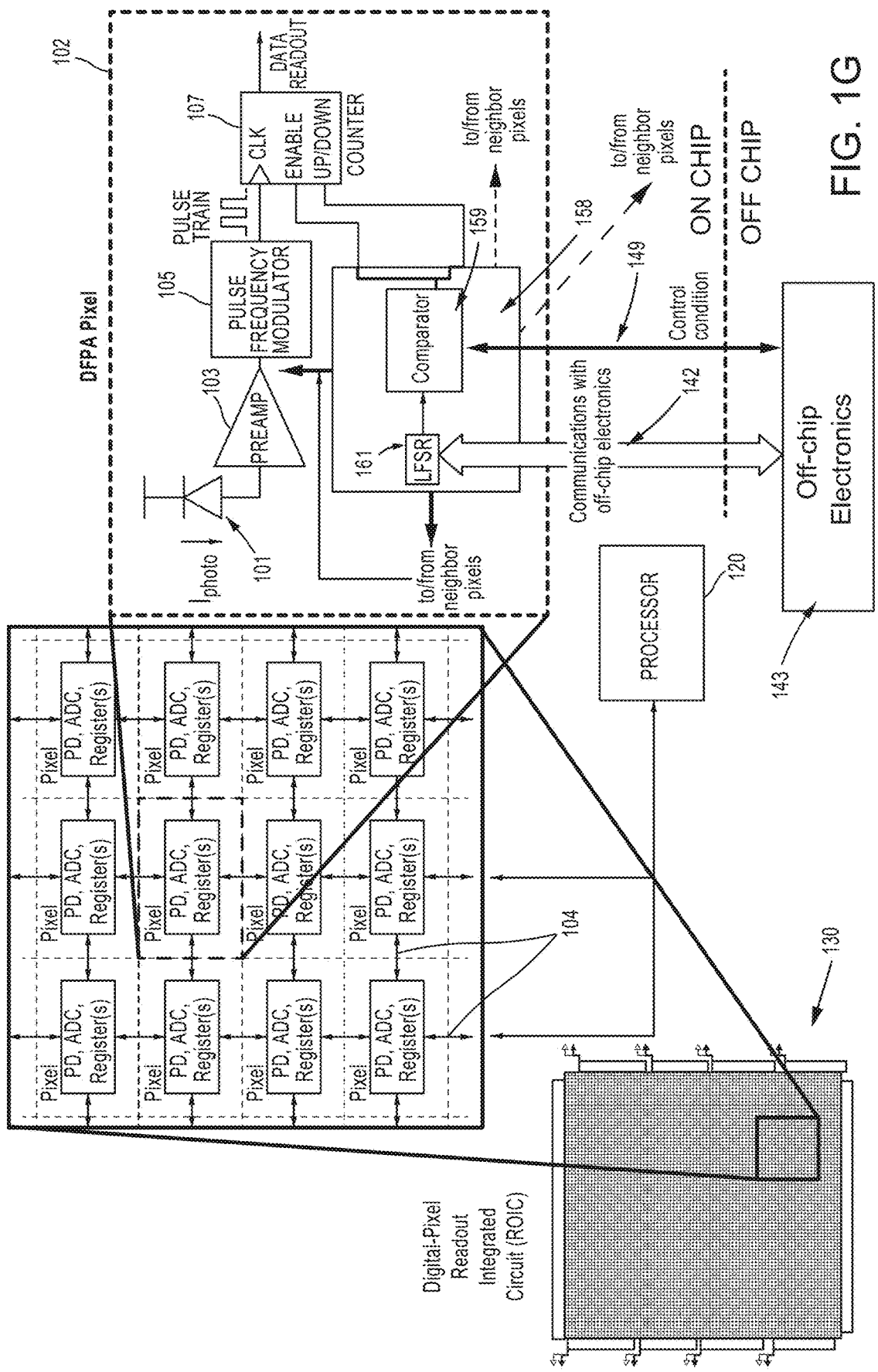
FIG. 1G shows a focal plane imaging apparatus, including a plurality of photodetectors, a plurality of analog-to-digital converters (ADCs), a plurality of digital registers, and a linear feedback shift register (LFSR) and comparator in communication with off-chip electronics, according to some embodiments.
Figure 1H:
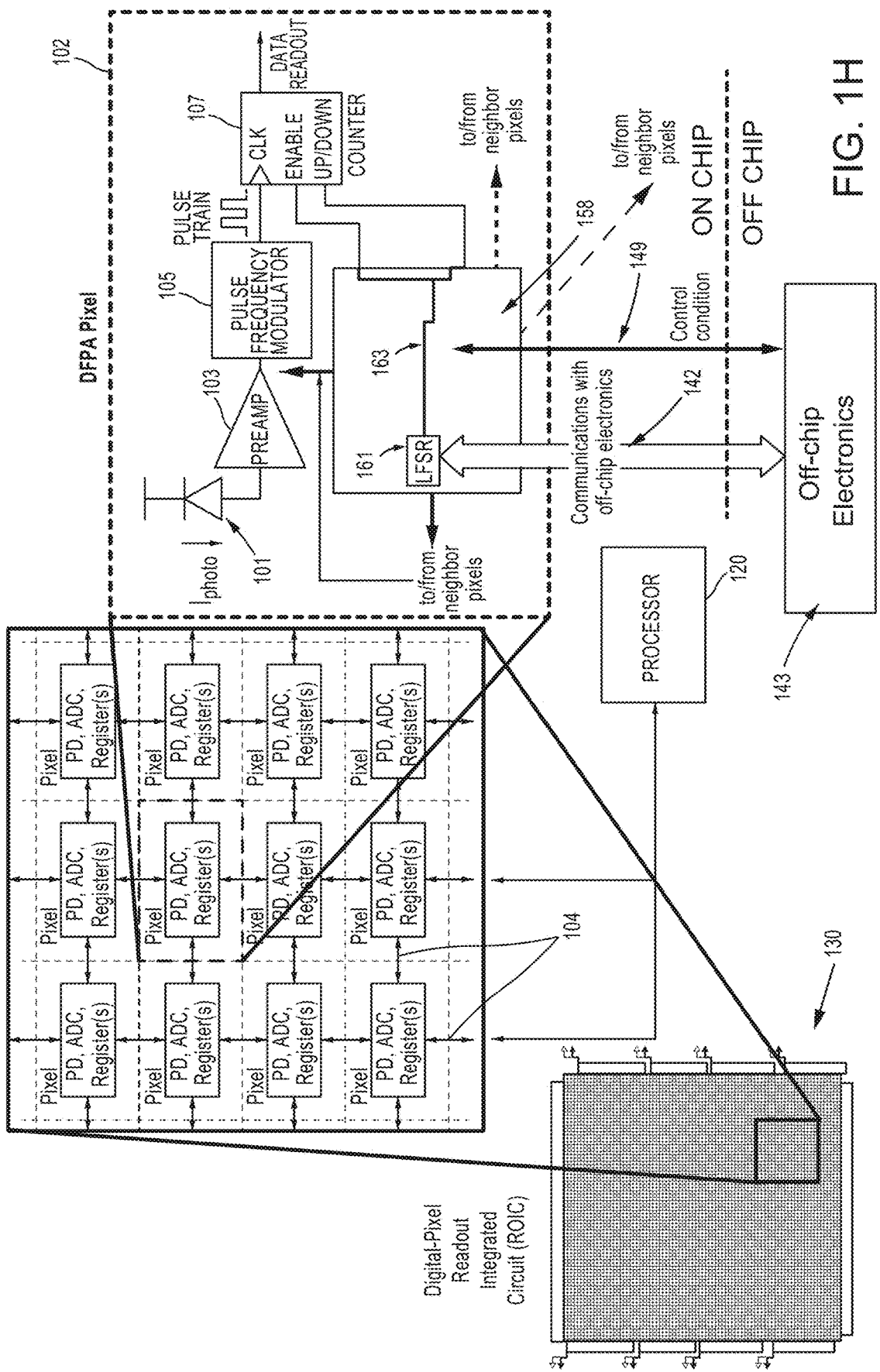
FIG. 1H shows a focal plane imaging apparatus, including a plurality of photodetectors, a plurality of analog-to-digital converters (ADCs), a plurality of digital registers, and a linear feedback shift register in communication with off-chip electronics, according to some embodiments.
Figure 1I:
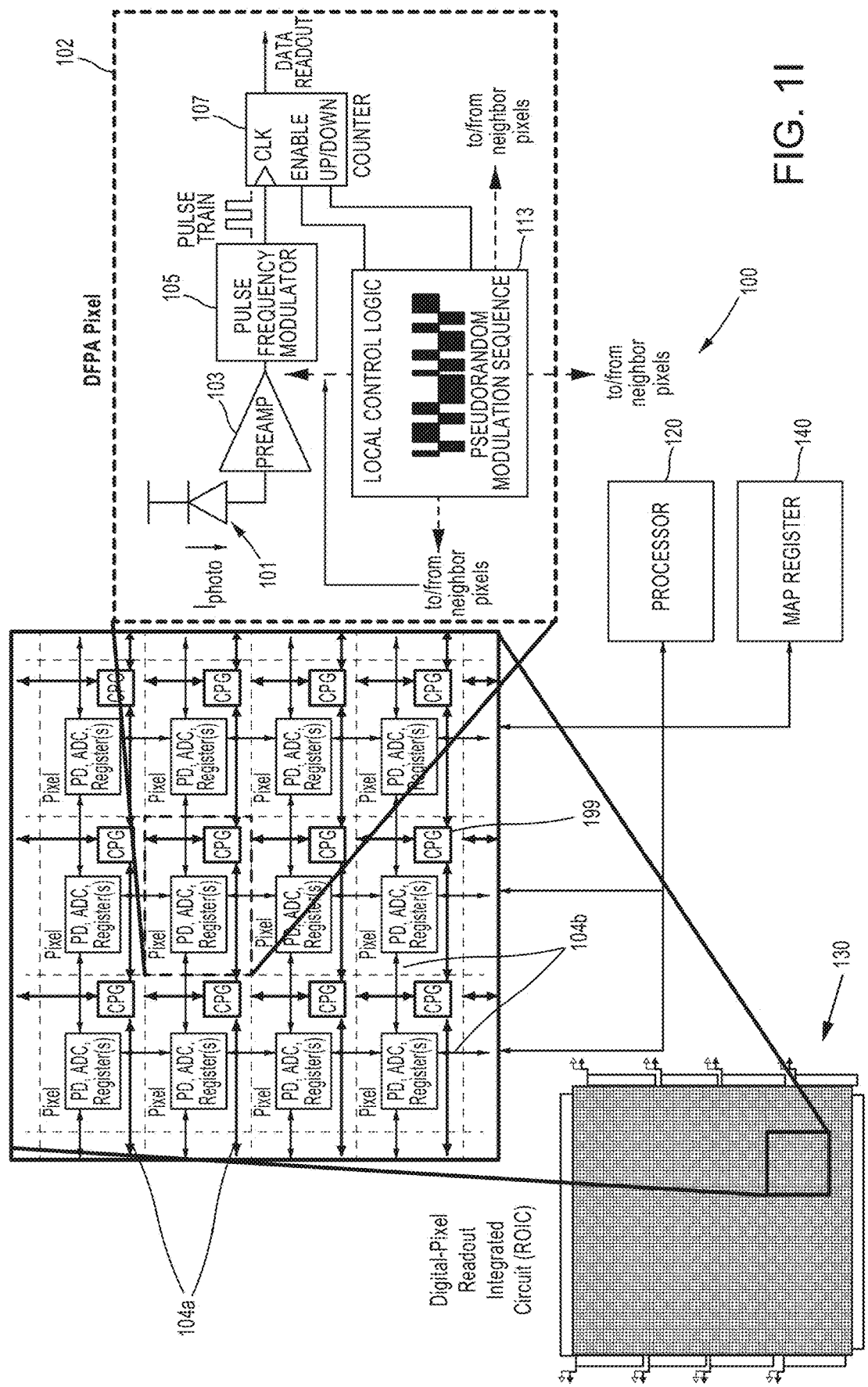
FIG. 1I shows a focal plane imaging apparatus, including a plurality of photodetectors, a plurality of analog-to-digital converters (ADCs), a plurality of digital registers, and distributed control pattern generation circuitry for in-pixel modulation, according to some embodiments.

FIG. 1G shows an embodiment in which a linear feedback shift register 161 is used, in place of the configuration register 157 of FIG. 1G, to provide a group assignment. FIG. 1H shows an embodiment in which a linear feedback shift register 161 is instantiated within the pixel logic block 158 and selected bits 163 are operably coupled to the counter. However, placing an entire linear feedback shift register within a pixel requires a considerable amount of pixel area and limits scalability. As such, some embodiments do not include an entire LFSR within a single pixel. Instead of mapping a single LFSR to a single pixel, these embodiments use a single LFSR to control several pixels of the DROIC, e.g., with one or more LFSRs controlling all of the pixels in a given DROIC. These LFSRs can reside within the DROIC, or can reside off-chip and communicate with the appropriate pixels (e.g., by way of communications interface 142). The transfer, storage and/or logical manipulation of LFSR data can be achieved by way of an on-chip distributed control pattern generator, as discussed below.

Distributed Control Pattern Generator

Figure 2A:
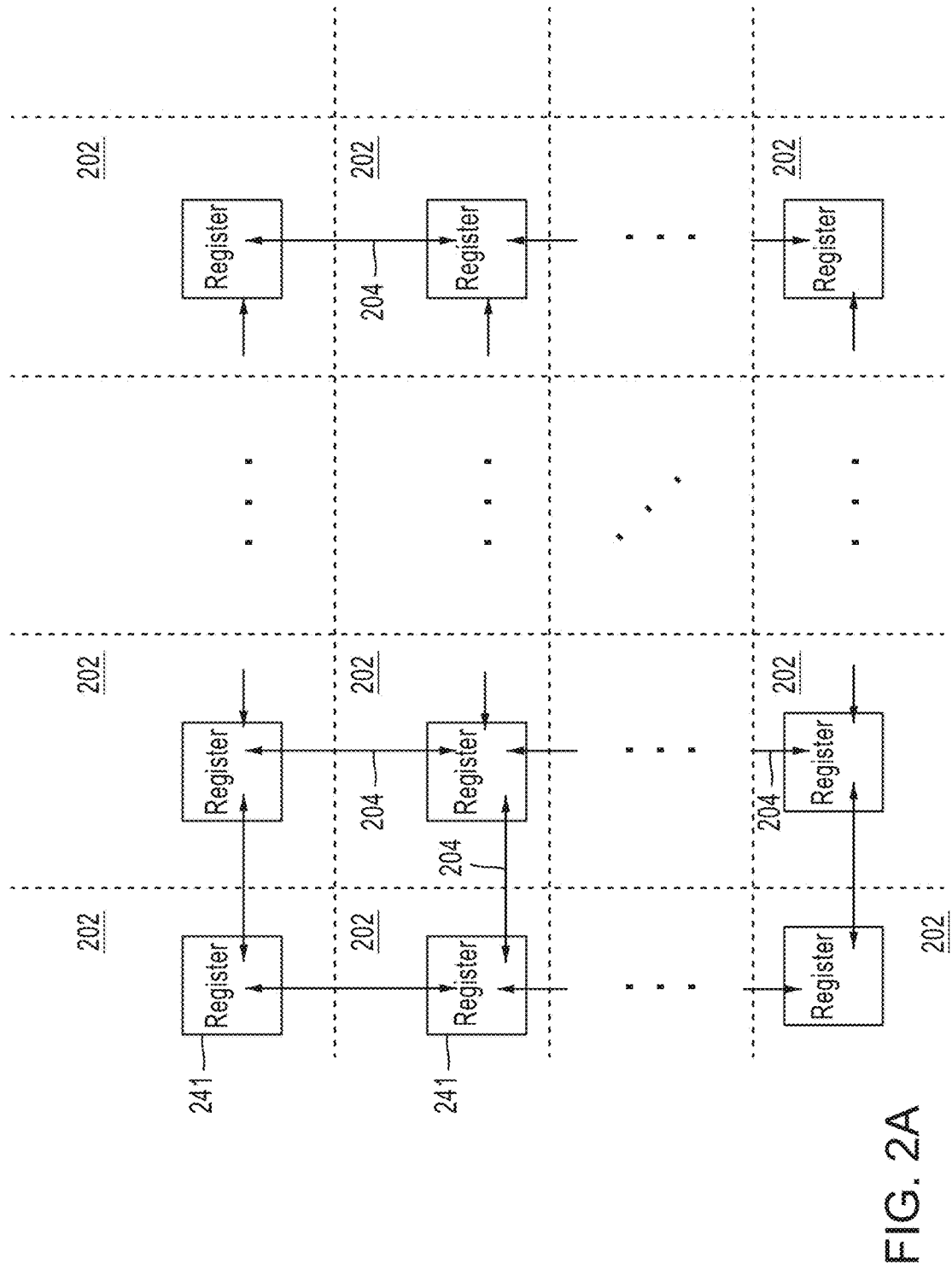
FIG. 2A shows a distributed control pattern generator circuit that includes interconnected control registers in each pixel of a focal plane imaging apparatus, according to some embodiments.

FIG. 2A illustrates a distributed control pattern generator 200 that generates and distributes pseudorandom modulation without a separate pseudorandom pattern generator in each pixel. More specifically, FIG. 2A shows a plurality of pixel control registers 241 connected to each other via an inter-pixel data transfer network 204. Together, the pixel control registers 241 and the pixel data transfer network 204 form the distributed control pattern generator circuit 200.

The data transfer network 204 can include electrical interconnect for passing signals between pixels of the focal plane imaging apparatus and/or for passing signals onto/off chip, and electronic logic components/circuitry for manipulating signals that are transferred between pixels. The data transfer network 204 and pixel control registers 241 may optionally form or include one or more LFSRs. The set of pixel control registers 241 are loaded either by way of an off-chip communication interface 142 (as shown in FIGS. 1D-1H) or with values residing elsewhere in the pixel 202. As discussed below with reference to FIG. 7, data from a digital register (e.g., digital register 707 in FIG. 7) can be input to a logic block within the pixel (e.g., logic block 713 in FIG. 7), in which can reside a control register 241. In operation, a pattern is first loaded from off-chip via interface 142, and during operation the pattern information is transferred from pixel 202 to neighboring pixel 202 using the inter-pixel data transfer network 204 to create a modulated pattern. Note that each register 241 takes among its inputs a set of values from other registers 241.

An exemplary distributed control pattern generator 200', with an inter-pixel data transfer network, is illustrated schematically in FIG. 2B. This distributed control pattern generator 200' includes a destination pixel 202' with a destination register 225 that is populated with values from a selected source register 211. A multiplexor 220 in the destination pixel 202' selects between the selected register 211 and unselected registers 210 based on a selector signal 215. The selector signal 215 may come from other control registers 241, from on-chip logic (e.g., 113 in FIG. 1A), or from an off-chip signal (e.g., read-in interface 142 in FIGS. 1D-1I).

Figure 2C:
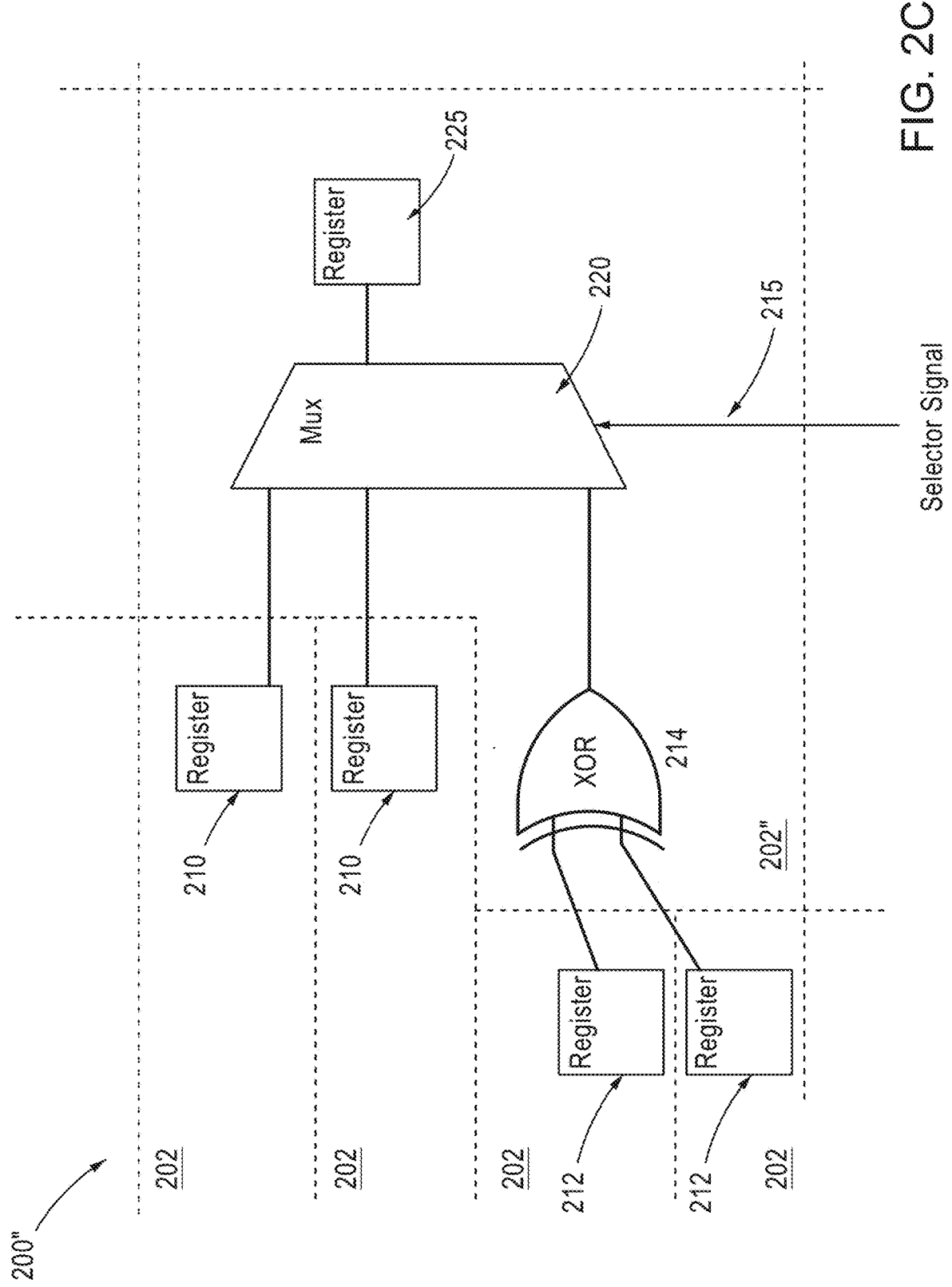
FIG. 2C is a schematic illustration of the distributed control pattern generator of FIG. 2A, including an exclusive OR ("XOR") gate, according to some embodiments.

FIG. 2C shows another embodiment of a distributed control pattern generator 200", in which an exclusive OR (XOR) gate 214 is added to at least one pixel 202" in the inter-pixel transfer network 204 so that one of the input options selected by selector signal 215 is the exclusive OR of outputs from control registers 212. This allows the destination control register 225 to receive either a value from a source control register 210 or to receive the XOR product of multiple control registers 212. By configuring the selector signals for each instance of the multiplexor 220, local implementations of linear feedback shift register circuits (such as is illustrated in FIG. 11) may be created in a distributed manner throughout the pixel array. In place of the XOR gate 214, other logic configurations may be used to form a variety of state machine types known to the art to generate a desired modulation pattern, where the modulation pattern state machine is similarly distributed through the pixel array.

Figure 2D:
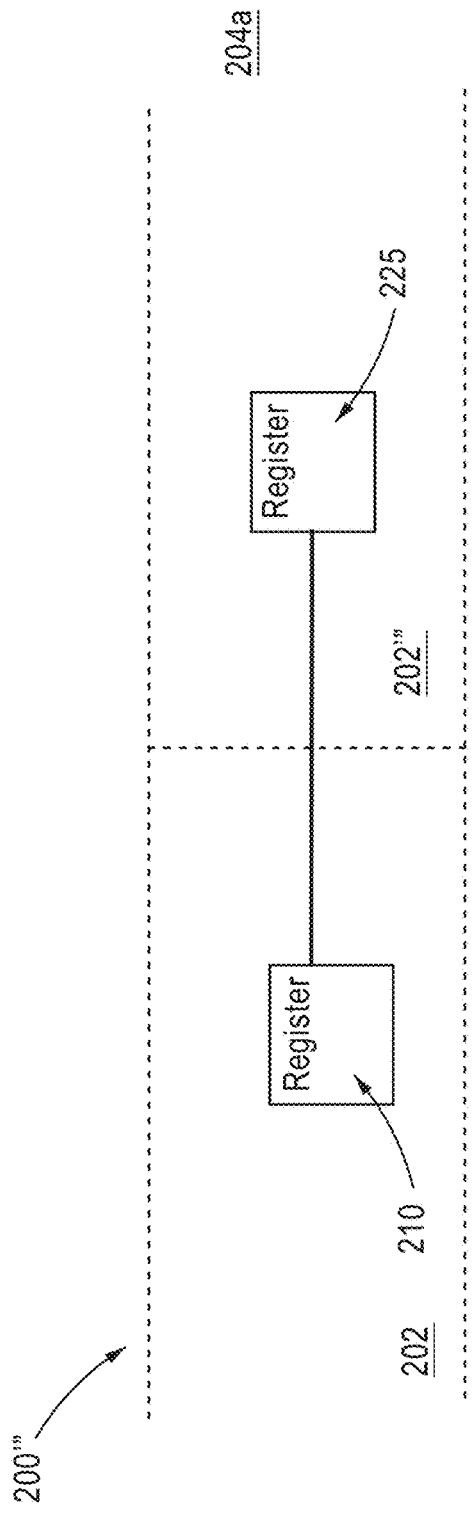
FIG. 2D is a schematic illustration of the distributed control pattern generator of FIG. 2A, showing direct inter-pixel transfer connections, according to some embodiments.
Figure 2E:
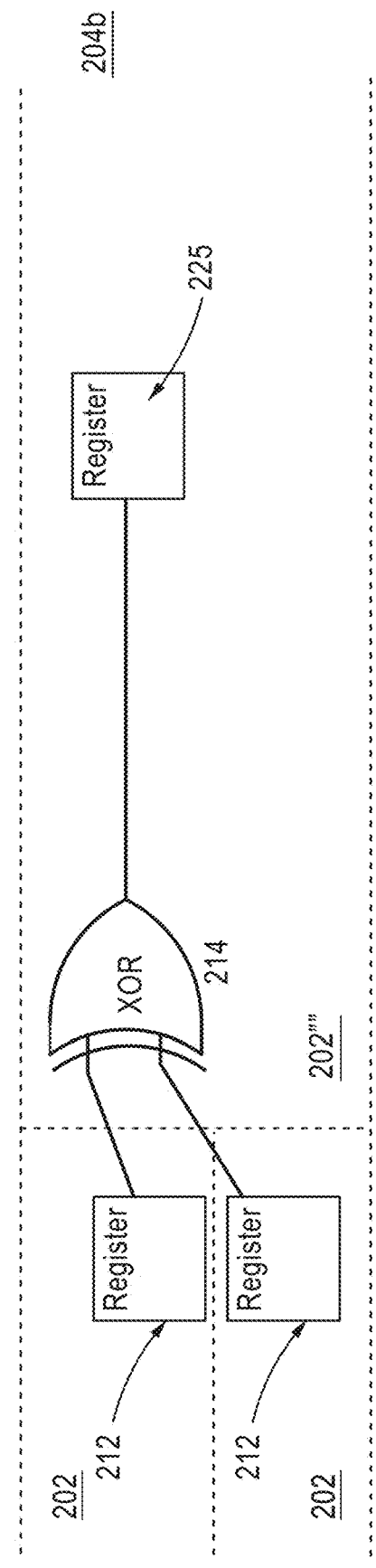
FIG. 2E is a schematic illustration of the distributed control pattern generator of FIG. 2A, showing XOR-gate transfer connections, according to some embodiments.

FIGS. 2D and 2E illustrate embodiments of a distributed control pattern generator 200''' and 200'''', in which the pixel array is implemented with a combination of direct inter-pixel transfer connections 204a and XOR-gate transfer connections 204b, respectively. For the direct connections 204a in FIG. 2D, data is transferred directly from a source register 210 to a destination register 225 in a destination pixel. For the XOR-gate transfer connections 204b in FIG. 2E, the XOR product of source registers 212 is computed by XOR gate 214 in a destination pixel 202'''' and is received and stored by destination register 225 in the destination pixel 202''''. Through selection of interconnectivity of registers and placement of instances of 204a and 204b, linear feedback shift register structures and other structured pattern generation structures may be implemented. For some embodiments, some instances of source register 210 or 212 may be replaced with hardwired zero or one values. In place of the XOR gate 214, other logic configurations may be used to form a variety of state machine types known to the art to generate a desired modulation pattern, where the modulation pattern state machine is similarly distributed through the pixel array.

Pixel Circuit Configurations

Figure 3:
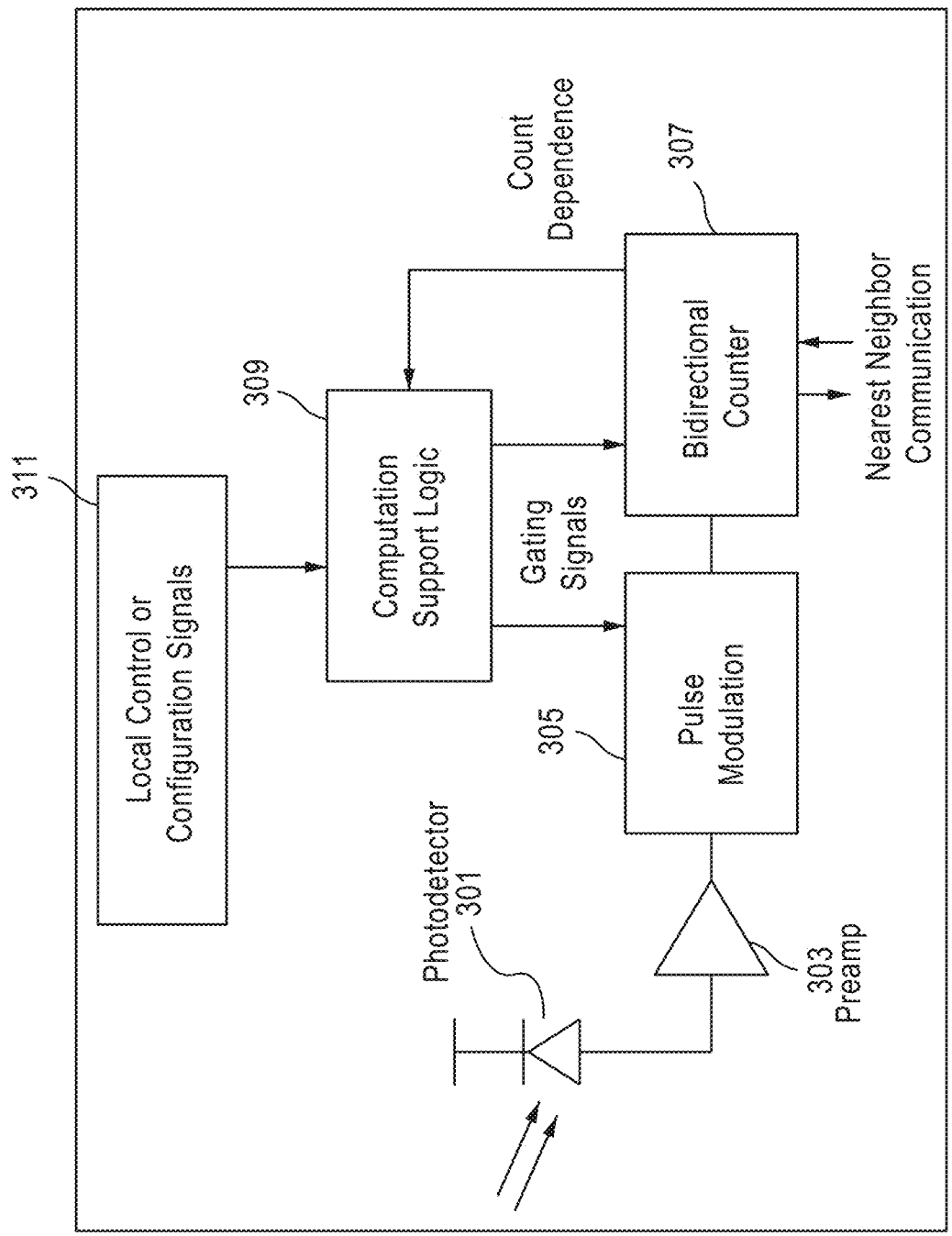
FIG. 3 is a schematic showing a pixel circuit, with a pulse modulator and a bidirectional counter, suitable for use in the focal plane imaging apparatus of FIGS. 1A and 1D-1I.

FIG. 3 is a schematic showing a pixel circuit with a pulse modulator 305 and a bidirectional counter 307 suitable for use in the focal plane imaging apparatus of FIGS. 1A and 1D-1I. The pixel circuit includes a photodetector 301 for receiving an input photocurrent, and a preamplifier 303 to amplify the current signal that is supplied to the pulse modulator 305 for analog-to-digital conversion. The converted digital signal (a digital representation of the input photocurrent) is then routed to the bidirectional counter 307 and stored. Gating signals, supplied via computation support logic 309, selectively apply processing operations to particular pixels via the pulse modulator 305 and/or the bidirectional counter 307. The pixel selection can be based on multiple criteria, such as peripheral selection signals, in-pixel configuration bits, counter state tests (e.g., thresholding and absolute value), and/or local control or modulation signals 311. For example, the gating signals output by the computation support logic 309 can be "count dependent," based on a value stored within the bidirectional counter 307. As shown in FIG. 3, each bidirectional counter can be electrically coupled to an adjacent pixel and configured for "nearest neighbor" communication therewith.

Figure 4A:
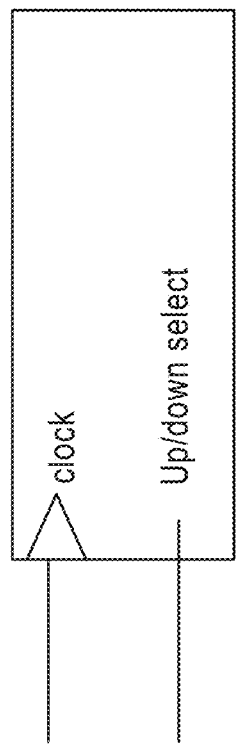
FIG. 4A is a schematic showing a bidirectional (up/down) counter suitable for use in the focal plane imaging apparatus of FIGS. 1A and 1D-1I.
Figure 4B:
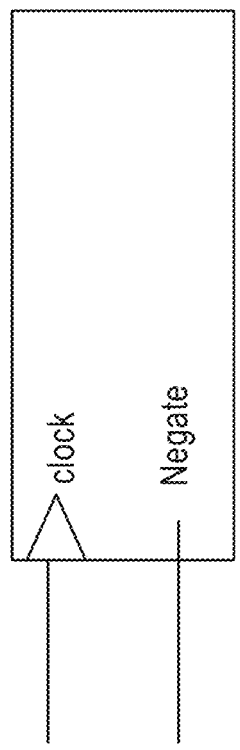
FIG. 4B is a schematic showing a negate counter suitable for use in the focal plane imaging apparatus of FIGS. 1A and 1D-1I.

In addition to incrementing proportionately to photocurrent, as described above with reference to FIG. 1A, each pixel circuit can be implemented to allow a wider variety of functions of photocurrent and previous state. For example, a pixel circuit may include a bidirectional counter (i.e., a count up/down counter) like the one in FIG. 4A and/or a negate counter like the one in FIG. 4B. A bidirectional counter has a direction pin that sets whether it will increment or decrement on each clock cycle. A negate counter is a counter that only increments, but that also can negate its value. The same result as decrementing on a bidirectional counter can be achieved using a negate counter by negating, incrementing, and negating again. To illustrate, taking a four input clock cycle starting at a value of "3" and counting down (i.e., using a bidirectional counter), the count would be "2, 1, 0, −1" (i.e., a result of "−1"). To obtain the same result using a negate-type counter, the 3 is first negated (to "−3"), the count proceeds as "−2 −1 0 1," and the result is negated to get "−1." In addition to incrementing or decrementing by a value of "1," other values can also be added or subtracted (e.g., 2, 4, etc.). In some embodiments, a value of the increment or decrement is determined/dictated by one or locally stored bits (e.g., in the configuration memory).

Figure 5:
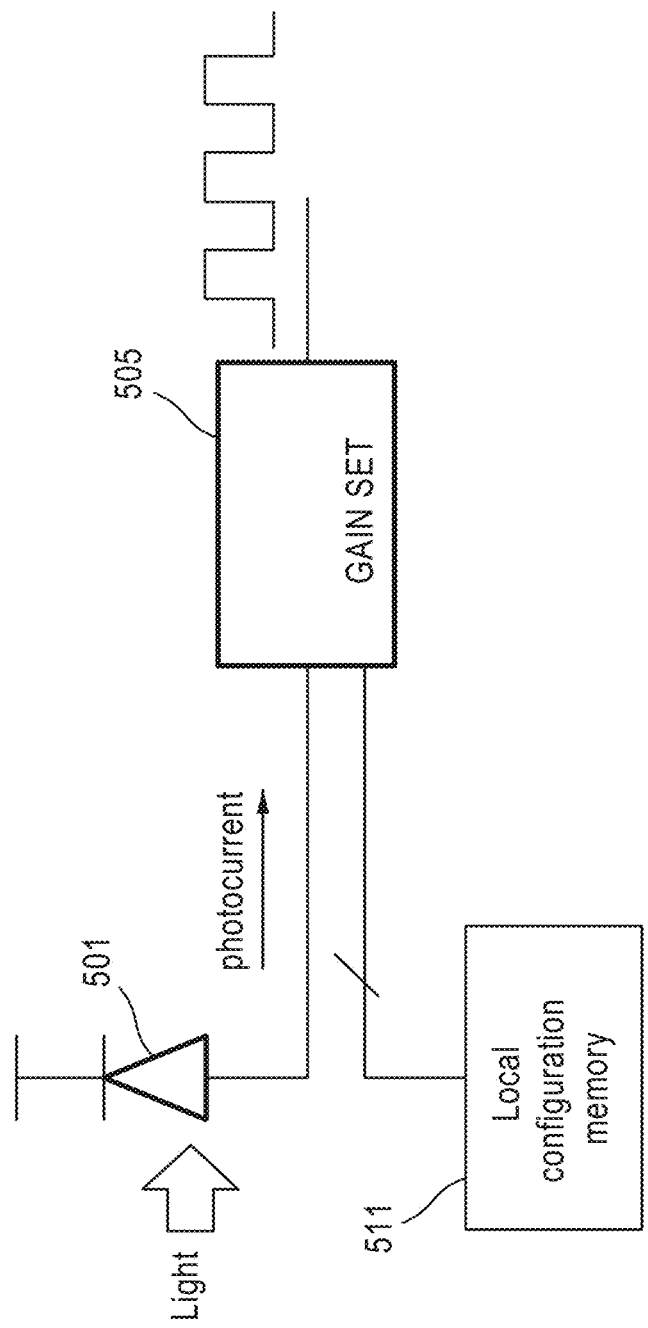
FIG. 5 is a schematic showing a pixel circuit with local ADC gain configurability suitable for use in the focal plane imaging apparatus of FIGS. 1A and 1D-1I.

FIG. 5 is a schematic showing a pixel circuit with local gain configurability, according to some embodiments. In order to allow each pixel to independently process the incoming photocurrent (generated by photodetector 401) according to its own specified transfer function, pixel configurability can be implemented. As shown in FIG. 5, the gain of the ADC 505 (e.g., the gain of a current-to-frequency converter) can be set by a digital input to that module. This digital input may be connected to a local configuration memory 511 (as shown in FIG. 5), a register bank, or any other digital bus. Alternatively or in addition, the modulation of storage in one or more counters can also be set by a digital input. In some embodiments, a gain set function can refer to an analog conversion gain applied to the photodiode 501. For example, the gain set function can be implemented by performing a digital-to-analog conversion of conversion data (e.g., in the local configuration memory) and subsequent modulation of the photodiode gain.

Figure 6:
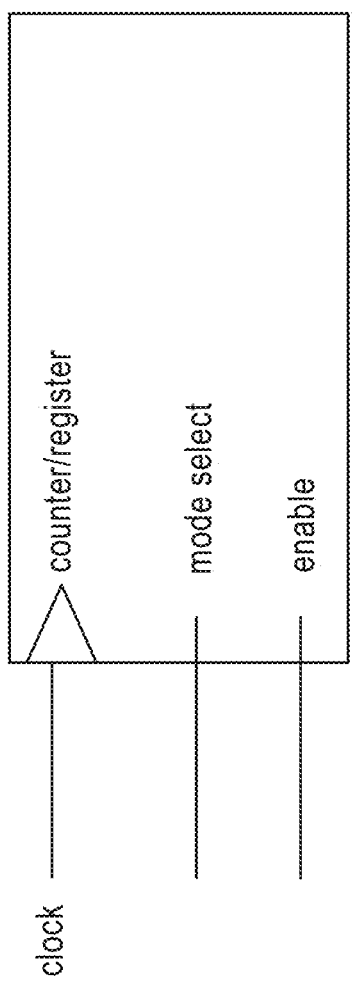
FIG. 6 is a schematic showing a counter/register block with a clock, a mode selection bus, and an enable pin suitable for use in the focal plane imaging apparatus of FIGS. 1A and 1D-1I.

Another way in which pixels may be independently configured to implement their own transfer functions is through the use of an enable pin on the counter/register structure. FIG. 6 is a schematic showing a counter/register block with a clock, a mode selection bus, and an enable pin, according to some embodiments. The mode selection bus can determine the operation to be performed at each clock cycle, and the enable pin can determine whether the circuit heeds the clock. The mode select can include a wide variety of operations that include increment, decrement, negation, shifting, etc.

Figure 7:
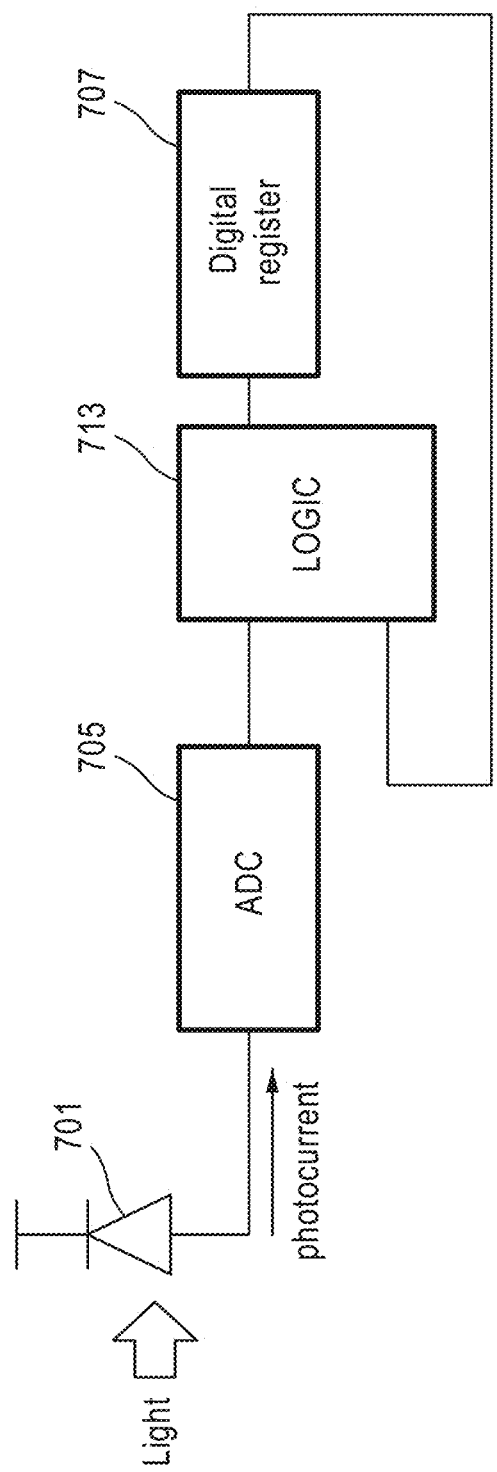
FIG. 7 is a schematic showing a pixel circuit with an ADC, logic, and a digital register suitable for use in the focal plane imaging apparatus of FIGS. 1A and 1D-1I.

FIG. 7 is a schematic showing a pixel circuit with a photodetector 701, an ADC 705, logic module 713, and a digital register 707, according to some embodiments. In addition to performing a raw transfer of the ADC 705 output to the digital register 707, the logic module 713 can set a new register state of the digital register 707. The new register state may be a function of a previous state of the digital register 707 and the ADC 705 output. During operation, photons incident on the photodetector 701 are converted by the photodetector 701 into photocurrent that is electrically routed to the ADC 705 for conversion into a digital signal (a digital representation of the photocurrent). After the analog-to-digital conversion, the digital signal is then routed to a logic module 713 for manipulation (e.g., via a logic operation) prior to arriving at the digital register 707 where the digital representation (e.g., as modified by logic module 713) may or may not be stored, a count may be incremented or decremented, etc. In other words, the logic module 713 sets a register state (e.g., count direction, enable/disable, etc.) of the digital register 707. In some embodiments, the output of the digital register 707 can be electrically tied to the logic module 713, for example such that a "new" register state of the digital register 707 is set to a designated function of a previous state of the digital register 707 and the ADC 705 output. In some embodiments, a type of logic function employed by the logic module 713 is dependent upon an output state of the digital register 707.

FIG. 8 is a schematic showing a pixel circuit with a photodetector 801, a preamplifier 803, a pulse frequency modulator 805, local control logic 813 enabling a pseudorandom modulation sequence, and a bidirectional counter 807, according to some embodiments. A photocurrent ("$I_{photo}$") proportional to an incident photon flux is induced in photodetector 801, and amplified by preamplifier 803. The amplified analog photocurrent signal is converted to a "pulse train" digital signal by the pulse frequency modulator 805. The digital signal is routed to a clock pin of the counter 807, clocking the digital counter 807 (for example, by incrementing with each pulse). One or more pseudorandom modulation sequences are produced by the local control logic module 813, which is electrically coupled to an enable pin and an up/down (i.e., "mode select") pin of the counter 807, and the modulated imaging data is read out from the counter 807.

Pixel Group Assignments

In some embodiments, individual pixels are assigned to one of a plurality of "groups," with the group assignments stored in the map register 140 shown in FIG. 1A. Pixel group membership can be used, for example, to determine whether or not to increment or negate a corresponding counter of the pixel over a predetermined segment of time. Group assignments for individual pixels are pre-set within a configuration memory. FIG. 9 is a schematic showing a digital logic circuit in which a two-bit pixel group assignment is used to assign a pixel to one of four different groups. A value in the configuration memory 915 is compared to a value on a two-bit control bus (control signals "CLKCTRL(0)" and "CLKCTRL(1)"), and the enable signal is only high when the value on the control bus matches the value in the configuration memory (i.e., CLKCTRL=CLKPROG). The enable in FIG. 9 can be used, for example, as an enable input in FIG. 6. The approach shown in FIG. 9 can be extended to an arbitrary number of bits.

Figure 10:
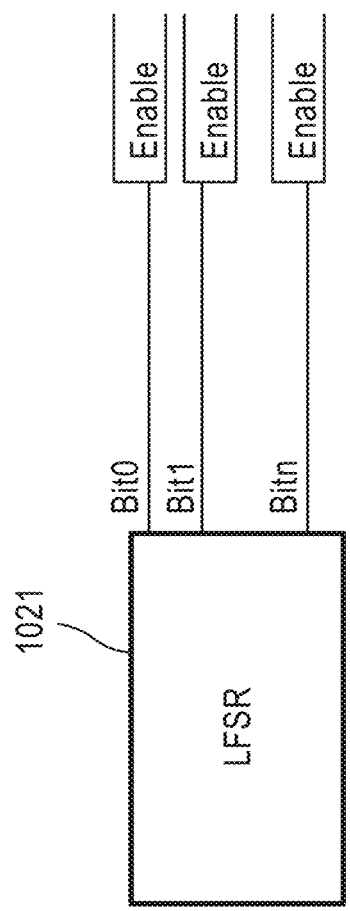
FIG. 10 is a schematic showing a linear feedback shift register (LFSR) applying pseudorandom pixel group assignment to a plurality of pixels, according to some embodiments.

FIG. 10 is a schematic showing a linear feedback shift register ("LFSR") applying pseudorandom pixel group assignment to a plurality of pixels, according to some embodiments. Each pixel of the focal plane imaging apparatus can be assigned one or more bits of the LFSR 1021, and LFSRs can be local to one pixel or to a neighborhood of pixels. The LFSR 1021 may be "seeded," for example with bits from the resident image in the counter/register or with a pre-loaded pattern, allowing for a seed that varies across the array. The LFSR 1021 can be clocked at a rate much faster than the integration time, so multiple LFSR clocks can be placed between integrations, thereby increasing spatial decorrelation.

In some embodiments, the pixel architecture contains a 14-bit configuration register where a pre-loaded binary-valued mask is loaded into memory and a map register (e.g., map register 140 in FIG. 1A) stores four separate group assignments. The group assignments are assigned via LFSR 1123 (see FIG. 11) utilizing the least-significant bit and most-significant bit of the 14-bit map register to assign pixels to four separate pixel groups. Note that LFSRs can be used to produce pseudo-random sequences. A bidirectional counter is then sent instructions indicating which groups to negate versus time to render a spatially and temporally quasi-random space-time code. To generate the group assignments pseudorandomly, a pseudorandom number generator is employed. FIG. 11 shows an LFSR that cycles through a pseudorandom sequence of $2N-1$ numbers, where N is the number of bits in the LFSR (e.g., see "Bit0," "Bit1," and "Bitn" in FIG. 10). Pseudorandom group assignment can be used to map a set of enable pins to a set of LFSR bits. The time-varying group assignments can have a distribution of values across the plurality of digital registers.

Figure 12:
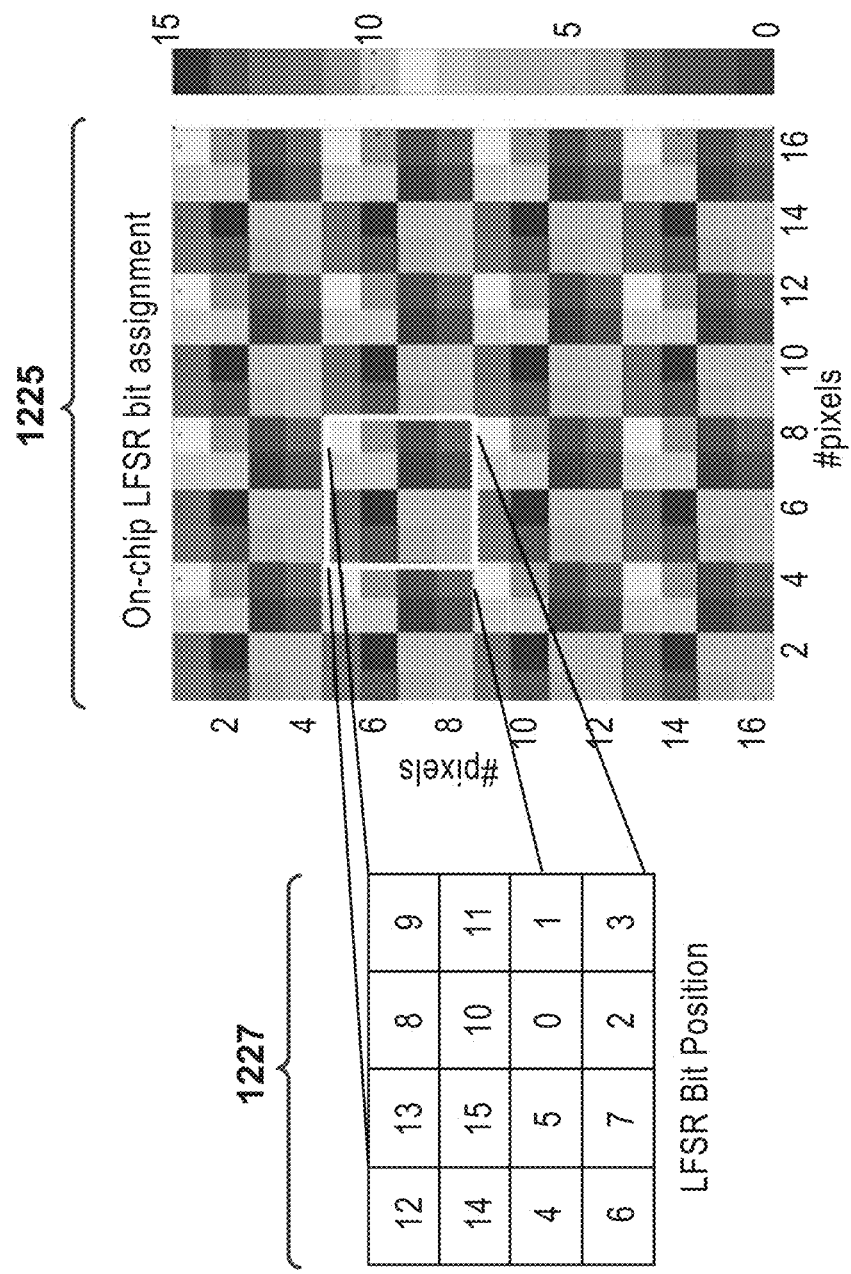
FIG. 12 is a rendering showing a 16×16 sub-region of a detector array and a locally applied LFSR bit mapping for a 4×4 region of interest, according to some embodiments.

FIG. 12 shows an embodiment in which every 4-by-4 neighborhood of pixels includes a 16-bit linear feedback shift register as illustrated in FIG. 11, using the register connectivity approach presented in FIGS. 2C and 2D. In this case, the LFSR bit position shown in 1227 is tiled across a larger array of pixels 1225. While the pixel array has a repeating 4-by-4 pattern of interconnectivity, the entire array may be loaded with a seed matrix so that different 4-by-4 neighborhoods receive different seed values. The linear feedback shift register may be clocked any number of times between use of its value, this allowing for further reduction of mask correlation.

Hence, using the architecture shown in FIG. 12, there is one LFSR per 4×4 neighborhood, and this neighborhood structure is repeated 64×64 times in a 256×256 detector array. Note that in this case multiple LFSR clocks can be used to avoid horizontal or vertical spatial correlation.

In some embodiments, horizontal or vertical correlations are desirable in that they implement a spatiotemporal gradient filter. For the example shown in FIG. 11, one LFSR clock between integrations will implement a horizontal correlation, two clocks will implement a vertical correlation, and three clocks will implement a diagonal correlation. Sixteen clocks will implement no correlation. By modifying the size of the LFSR and the assignment of LFSR bits to enable signals, spatial correlation can be minimized or maximized according to the design intent.

Figures 13A, 13B, 13C:
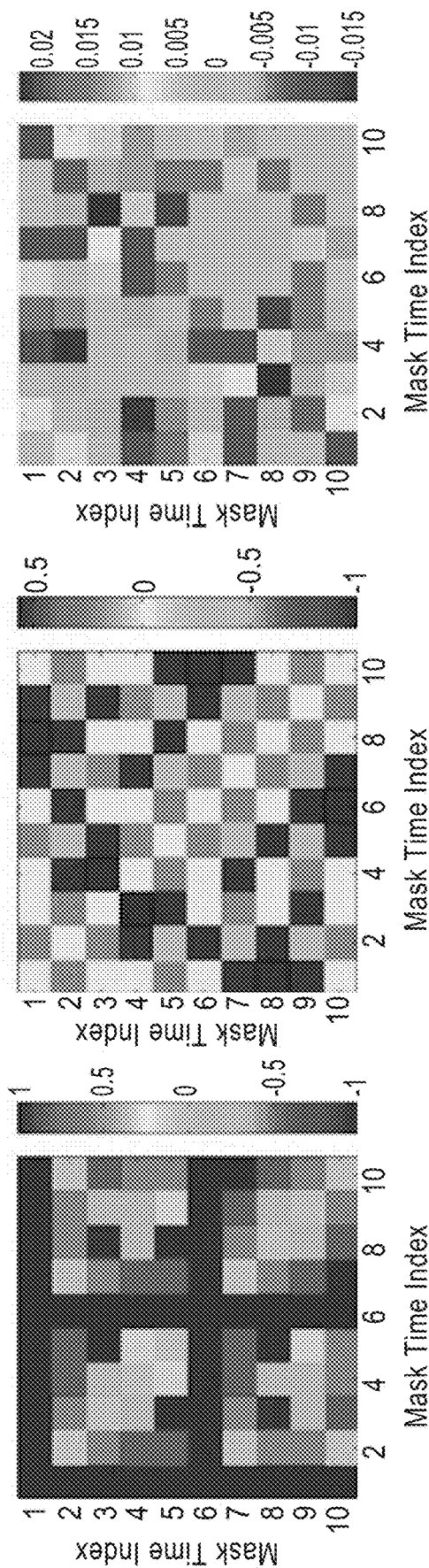
FIGS. 13A and 13B are space-time per-pixel modulation correlation matrices for pixel-group based encoding, according to some embodiments.
FIG. 13C is a space-time per-pixel modulation correlation matrix for local LFSR pseudorandom encoding, according to some embodiments.
Figure 13D:
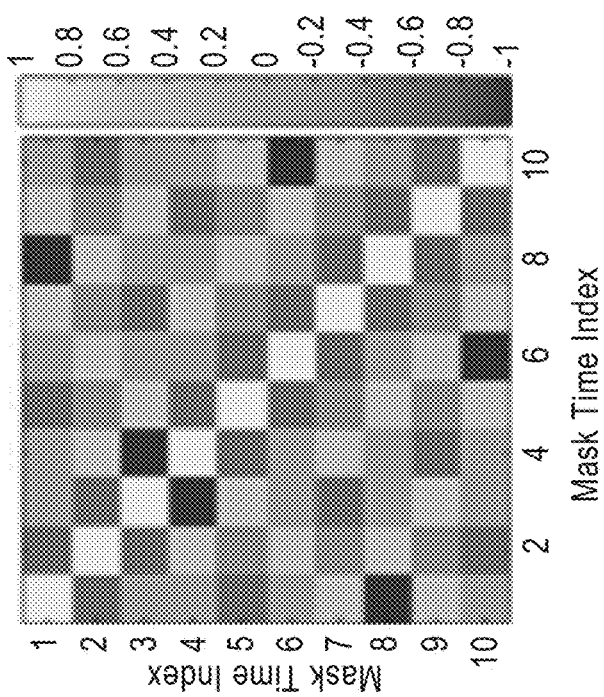
FIG. 13D is a space-time per-pixel modulation correlation matrix for encoding using four pixel groups, according to some embodiments.

FIGS. 13A and 13B are space-time per-pixel modulation correlation matrices for pixel-group based encoding, according to some embodiments, and the space-time per-pixel modulation correlation matrix for a pixel architecture employing a local LFSR pseudorandom encoding (e.g., 4×4 region of interest) 4,096 times across a 256×256 2D array, is shown in FIG. 13C. As shown in FIGS. 13A-13C, the local LFSR-based pseudorandom implementation improves the space-time correlation, thereby yielding improved 3D (e.g., x, y, and t) transient target recovery from a 2D space-time encoded projection recorded at the base detector frame rate. FIG. 13D is a space-time per-pixel modulation correlation matrix for encoding using four pixel groups, according to some embodiments, and can be contrasted with FIG. 13E, which shows a space-time per-pixel modulation correlation matrix for "ideal" LFSR modulation with off-diagonal mask correlation, according to some embodiments.

Figure 13E:
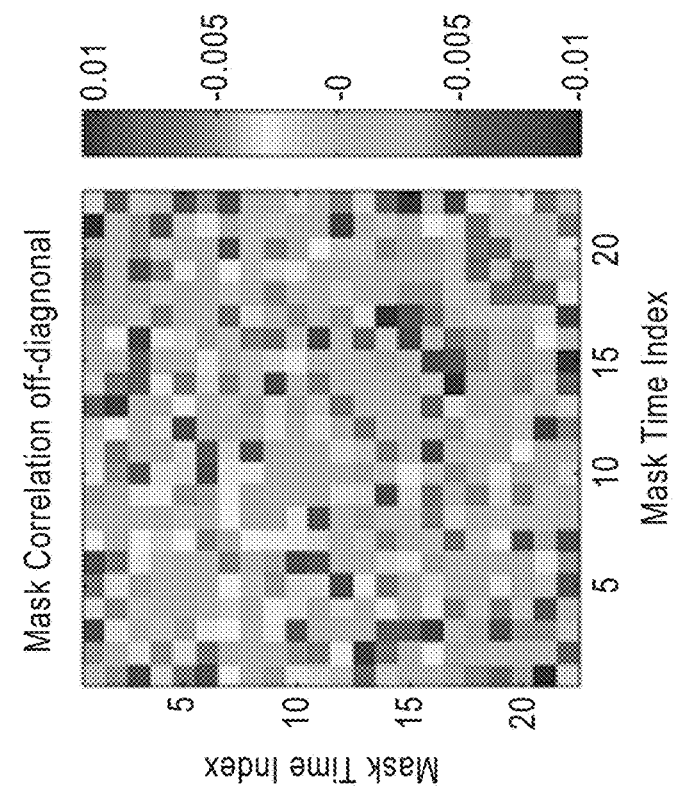
FIG. 13E is a space-time per-pixel modulation correlation matrix for "ideal" LFSR modulation with off-diagonal mask correlation, according to some embodiments.

FIGS. 13F-13H shows that a notable reduction in mask correlation can be achieved by using a distributed LFSR approach 1300, as compared to the previously described approach using four pixel groups (e.g., as discussed with reference to FIG. 12 and as represented by FIG. 13F). The plot in FIG. 13F (like FIG. 13D) shows the typical mask correlation for the case in which four pixel groups defined by configuration registers (such as configuration register 157 in FIG. 1F) are populated by the off-chip electronics (such as 143 in FIG. 1F) via an interface (such as read-in interface 142 in FIG. 1F) using bits 0 and 15 of a 16-bit linear feedback shift register. When compared to the "ideal" mask correlation (e.g., as shown in FIG. 13E) that could be obtained if each pixel had its own linear feedback shift register, the mask correlation is high, limiting the quality of achievable reconstruction.

System Operation

Figure 14:
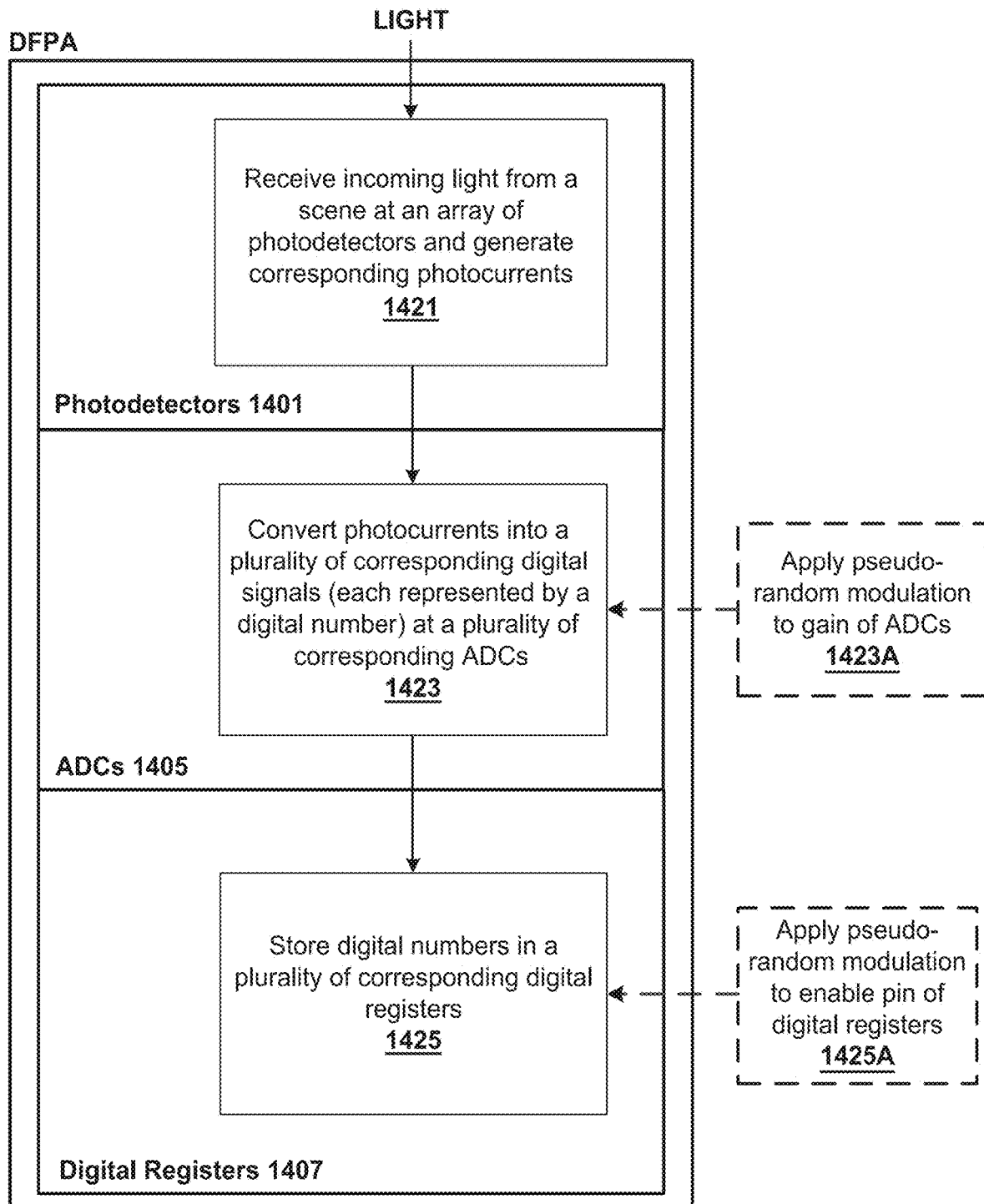
FIG. 14 is a flow chart that illustrates a process for focal plane imaging using a digital focal plane array (DFPA), according to some embodiments.

FIG. 14 is a flow chart that illustrates a process for focal plane imaging using a digital focal plane array (DFPA), according to some embodiments. Light reflected from a scene of interest is received, at 1421, at an array of photodetectors 1401 each of which generates a corresponding photocurrent. The photocurrents are converted, at 1423, into a plurality of corresponding digital signals (each represented by a digital number) at a plurality of corresponding ADCs 1405. The gain of each of the ADCs 1405 may be pseudo-randomly modulated (at 1423A). The digital numbers are stored, at 1425, in a plurality of corresponding digital registers 1407, each comprising an enable pin that may be pseudo-randomly modulated (at 1425A). The process shown in FIG. 14 can be performed on a single integrated circuit (IC) chip.

In some embodiments, processes described herein further include calculating, via a processor, a three-dimensional (x, y, t) image of the scene of interest based on the pseudo-random modulation and values stored in the plurality of digital registers.

Figure 15:
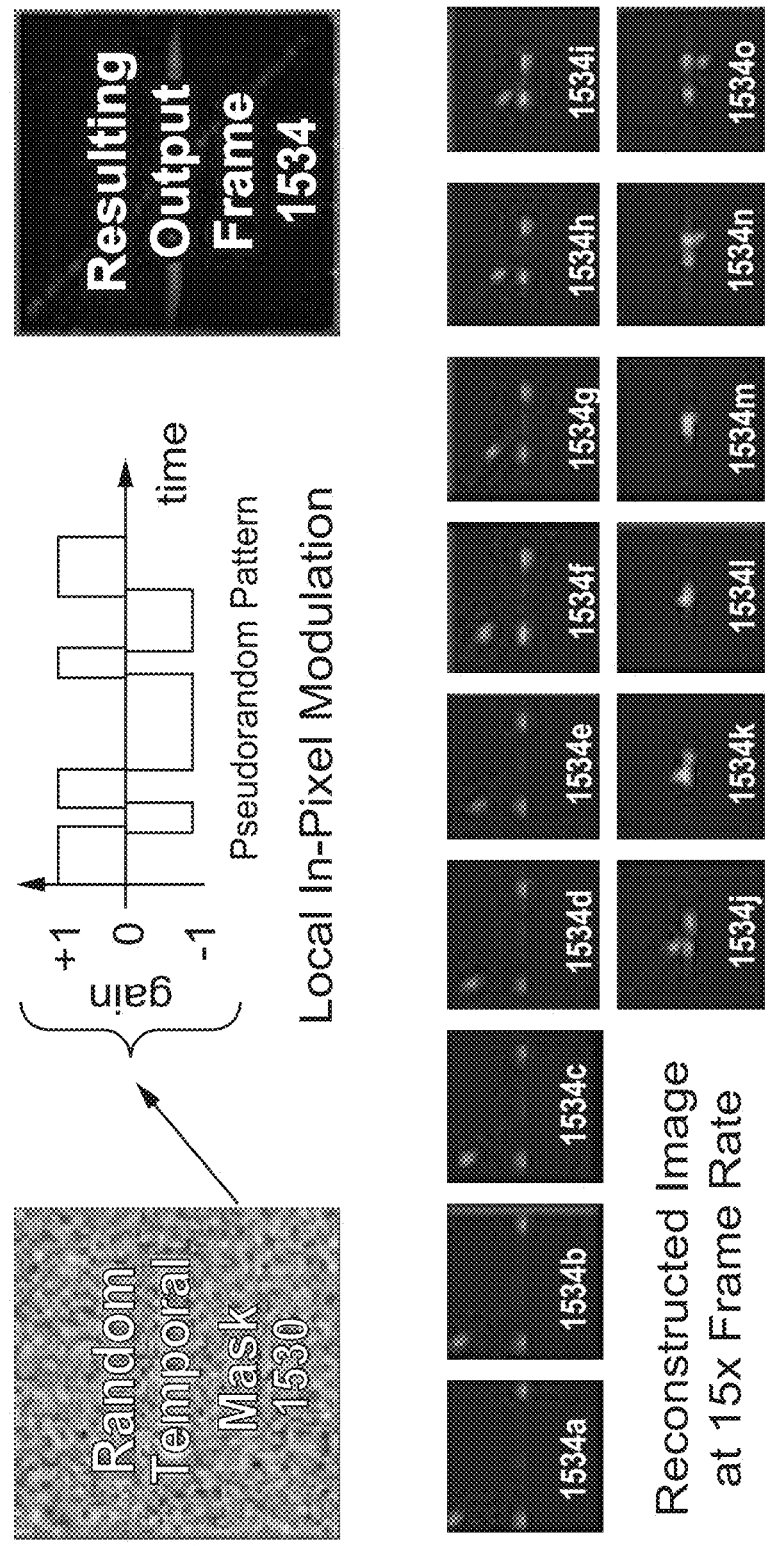
FIG. 15 shows a series of images that have been reconstructed using local, in-pixel pseudorandom time-varying modulation, according to some embodiments.

FIG. 15 shows a series of images that have been reconstructed using local, in-pixel pseudorandom time-varying modulation, according to some embodiments. A random temporal mask 1530 is employed, with an exemplary local in-pixel temporal gain modulation pattern shown at 1532, and a resulting output frame is shown at 1534. The reconstructed image is produced at 15x the frame rate, and fifteen image "slices," acquired within a single frame, are shown in the sequence of 1534a to 1534o. In some embodiments, image reconstruction is accomplished using compressive sensing algorithms, as discussed below.

Compressive Sampling Algorithms and Transient Image Reconstruction

Compressive sampling algorithms can be applied to coded-aperture temporal imaging to enable (x, y, t) data-cube estimation from a low-speed temporally encoded projection of transient targets. Compressive sensing enables data recovery at sub-Nyquist sampling rates. The sparsity matrix and the measurement matrix can be designed such that the matrix combination satisfies the restricted isometry property ("RIP"). Incoherence between the sparsity matrix and measurement matrix is an important metric. The combination of on-chip per-pixel modulation and algorithmic recovery from sub-Nyquist measurements enables 3D(x, y, t) data recovery from a 2D(x, y) space-time encoded measurement.

In some embodiments, a mathematical framework for 2D space-time encoding is defined as $$g_{i,j} = \sum_{t}^{T} M_{i,j,t} f_{i,j,t} + n_{i,j}, \quad (1)$$

where $f_{i,j,t}$ corresponds to the discretized form of the 3D (x,y,t) target vector at spatial indices (i,j) and at time t, $M_{i,j,t}$ represents the per-pixel modulation at spatial indices (i,j) and at time t, $n_{i,j}$ is the additive white Gaussian noise at spatial indices (i,j), and g is the measured data over all pixels ($N_R \times N_C$) and over T sub-frames. The temporally-varying modulation at each pixel modulates a moving scene at rates faster than the readout rate of the detector. The forward model in matrix notation is defined as:

$$g = Mf + n, \quad (2)$$

where $f \in \mathfrak{R}^{N_R N_C T \times 1}$ is the discrete object vector, $g \in \mathfrak{R}^{N_R N_C \times 1}$ is the measurement vector, $M \in \mathfrak{R}^{N_R N_C \times N_R N_C T}$ is the binary-valued (−1,1 or 1,0) time-varying per-pixel modulation matrix, and the noise vector is represented as $n \in \mathfrak{R}^{N_R N_C \times 1}$. The matrix M inherently includes the system optical blur and embeds the temporal downsampling operation of the slow-speed camera. Assuming a unitary M matrix, the transpose model is defined as:

$$f_{est} = M^T g, \quad (3)$$

where $f_{est}$ is the linear estimate and $M^T$ is also equivalent to $M^{-1}$. An adapted two-step iterative shrinkage/thresholding (TwIST) total variation (TV) minimization algorithm is used for data-cube (x,y,t) estimation from a single 2D (x,y) space-time encoded image of a transient scene. The least squares data-cube estimate, $f_{est}$, provides a spatial (x,y) and temporal (t) representation of a scene of interest. Using TwIST, a convex objective function is minimized. TwIST is defined as:

$$f^* = \arg\min_f \|g - Mf\|_2^2 + \tau \varphi_{iTV}(f), \quad (4)$$

where f* is the TwIST data-cube estimate, τ is the regularization scaling parameter (e.g., small values preserves edges and large values blur the data-cube estimate), and $\varphi_{iTV}$ represents the isotropic discrete TV regularizer. The isotropic discrete TV regularizer in two dimensions is defined as $$\varphi_{iTV}(f) = \sum_t \sqrt{(\Delta_t^h f)^2 + (\Delta_t^v f)^2}, \quad (5)$$

where $\Delta_t^h f$ and $\Delta_t^v f$ are gradient (i.e., difference) operators along the horizontal and vertical spatial dimensions of the image. The TV regularizer is further defined as:

$$\varphi_{iTV,3D}(f) = \sum_t \sum_{i,j} \sqrt{(f_{i+1,j,k} - f_{i,j,t})^2 + (f_{i,j+1,k} - f_{i,j,t})^2}. \quad (6)$$

The nonlinear convex optimization framework can apply a gradient constraint to each temporal slice of the estimated space-time data cube independently.

Figure 16E:
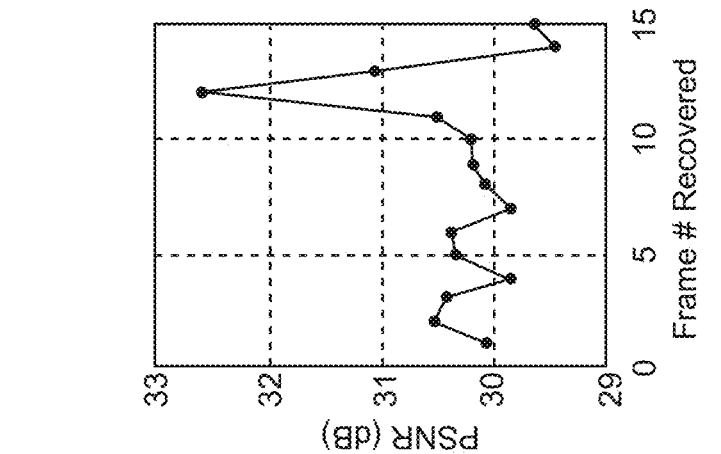
FIG. 16E is a plot of peak signal-to-noise ratio ("PSNR") values comparing baseline (x,y,t) target data of FIG. 16A with data-cube estimates versus sub-frame number, according to some embodiments.
Figure 16D:
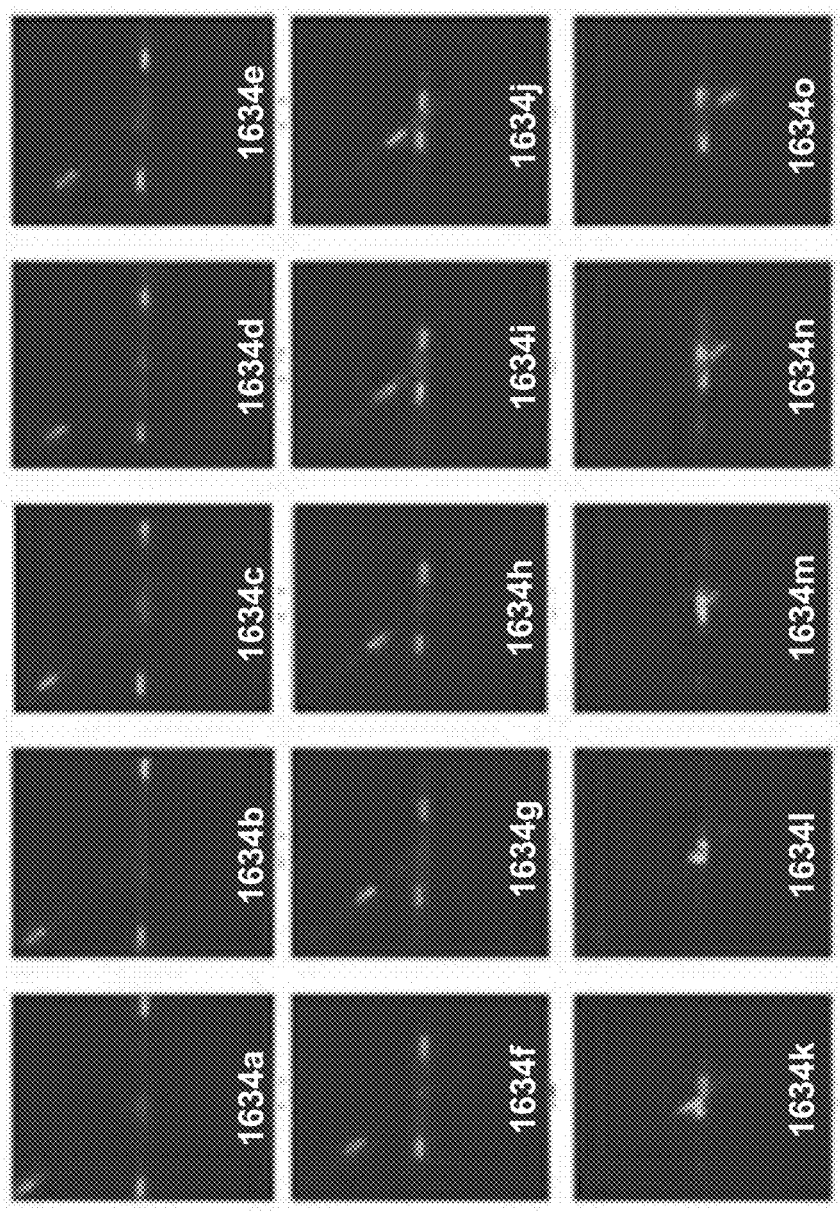
FIG. 16D is a series of images comprising reconstructed data yielding 15 time slices per frame acquired while imaging the three transient targets of FIG. 16A using the spatial modulation of FIG. 16B and temporal modulation via an LFSR as shown in FIG. 9.

FIG. 16A is a spatially extended baseline image of three transient targets (bullets), according to some embodiments. FIG. 16B is an example frame of a spatially randomized temporally modulated coded aperture used for imaging the baseline image of FIG. 16A. The transient target of FIG. 16A was imaged by a pixel array where each pixel is temporally modulated as illustrated temporally (via an LFSR) in FIG. 10 and spatially in Figure FIG. 16B. The raw modulated pixel output image at the detector, taken at the base readout frame rate, is shown in FIG. 16C. FIG. 16D is a series of images, 1634a-1634o, comprising reconstructed data yielding 15 time slices per frame acquired while imaging the transient target of FIG. 16A. Since the modulation, shown in FIG. 16B, occurs much faster than the readout frame rate, high-speed data can be reconstructed using compressive sensing algorithms as shown in FIG. 16D. The detector architecture preserves signal flux (i.e., 3 dB increase) by employing a −1,1 binary-valued mask instead of a 1,0 mask. FIG. 16E is a plot of peak signal-to-noise ratio ("PSNR") values comparing the baseline (x,y,t) target data of FIG. 16A with the (x,y,t) data-cube estimates versus sub-frame number.

Figure 17A:
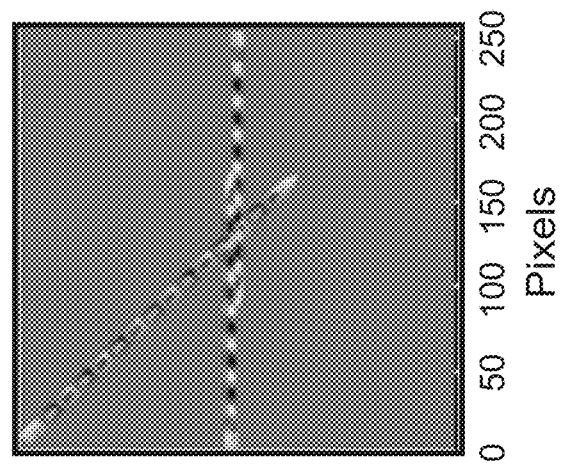
FIG. 17A is a simulated image of the three transient targets of FIG. 16A recorded using conventional modulation at a base readout frame rate, according to some embodiments.
Figure 17B:
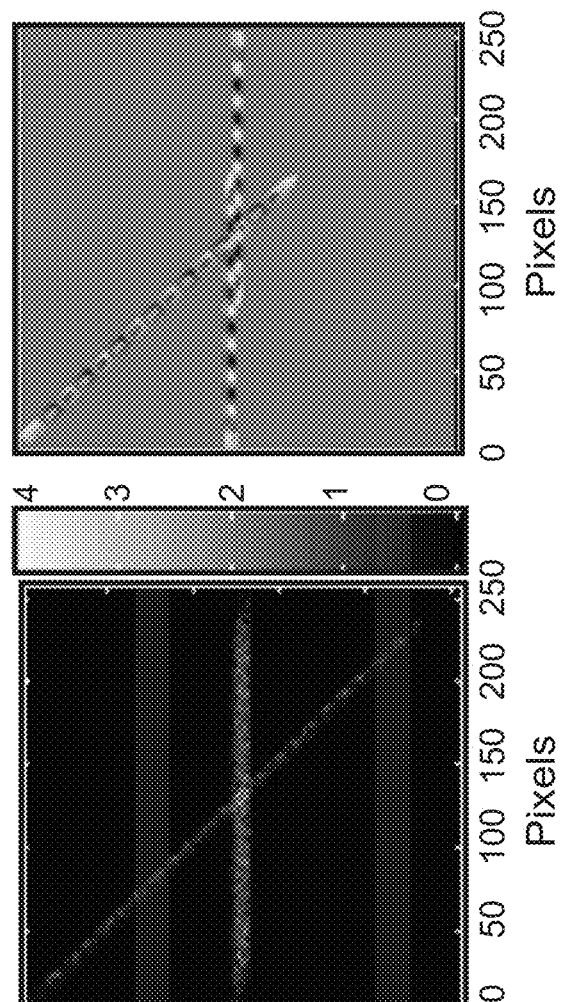
FIG. 17B is a simulated image of the three transient targets of FIG. 16A using on-chip per-pixel modulation at a base readout frame rate, according to some embodiments.
Figure 17C:
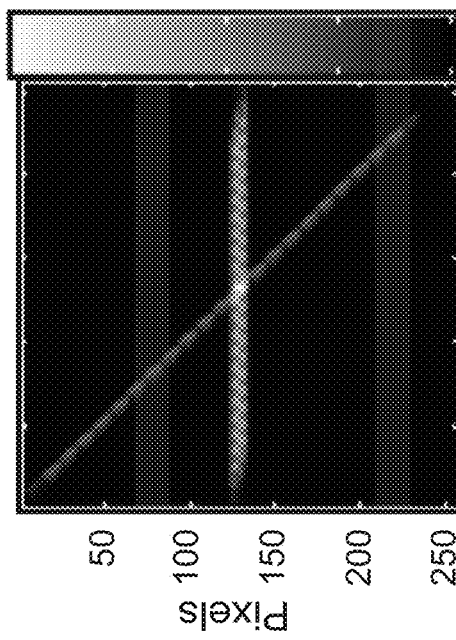
FIG. 17C is a simulated image of the three transient targets of FIG. 16A using on-chip global modulation at a base readout frame rate, according to some embodiments.

Conventional, space-time per-pixel modulation, and space-time global modulation data captured at the base detector frame rate can be compared in FIGS. 17A-C.

FIG. 17A is a simulated image of three transient targets of FIG. 16A recorded using conventional modulation at a base readout frame rate, according to some embodiments. As shown in FIG. 17A, conventional measurements cannot recover transient target features from the streak.

FIG. 17B is a simulated image of the three transient targets of FIG. 16A using on-chip per-pixel modulation at a base readout frame rate, according to some embodiments. As shown in FIG. 17B, on-chip per-pixel modulation enables snapshot multi-target and multi-frequency transient feature extraction.

FIG. 17C is a simulated image of the three transient targets of FIG. 16A using on-chip global modulation at a base readout frame rate, according to some embodiments. As shown in FIG. 17C, on-chip global modulation enables single frequency extraction.

As shown in FIGS. 17A-C, per-pixel modulation impacts the ability for 3D(x,y,t) target recovery. The per-pixel modulation manifests itself in at least the following two manners, depending upon the pixel implementation at the configuration register or via a local LFSR implementation, to generate a true pseudorandom space-time code.

Digital-domain per-pixel modulation can be modeled as $$M(x, y) = \sum_i \sum_j M_{i,j} rect\left(\frac{x - i\Delta_m}{\Delta_m}, \frac{y - j\Delta_m}{\Delta_m}\right), \quad (7)$$

where $M_{ij}$ represents the amplitude value at the $(i,j)^{th}$ position in the aperture code and $\Delta_m$ is the aperture-code pitch. Considering the pixel architectures in FIG. 5 and FIG. 9, $N_R \times N_C$ pixels are pseudorandomly assigned to four different pixel groups. A binary-valued (i.e., $-1,1$) space-time modulation is loaded from memory. Finally, during a single detector readout, pre-selected groups are negated (i.e., multiply by $-1$) T times. A final detector in-pixel modulation can be modeled as:

$$g_n = \sum_{x=1}^{T/2} f_{i=2x-1}\left[\prod_{j=1}^{T} M_j\right] - \sum_{x=1}^{T/2} f_{i=2x}\left[\prod_{j=1}^{T} M_j\right], \quad (8)$$

where T represents the number of sub-frames averaged in the detector readout period and recall that f is the transient object. The space-time correlation matrix for the modulation defined with Eqn.8 is shown in FIG. 13A. A more direct per-pixel modulation is denoted as $$g_n = \sum_t M_t f_t \quad (9)$$

and the space-time correlation matrix, maintaining the group assignment implementation is shown in FIG. 13B.

Figure 18A:
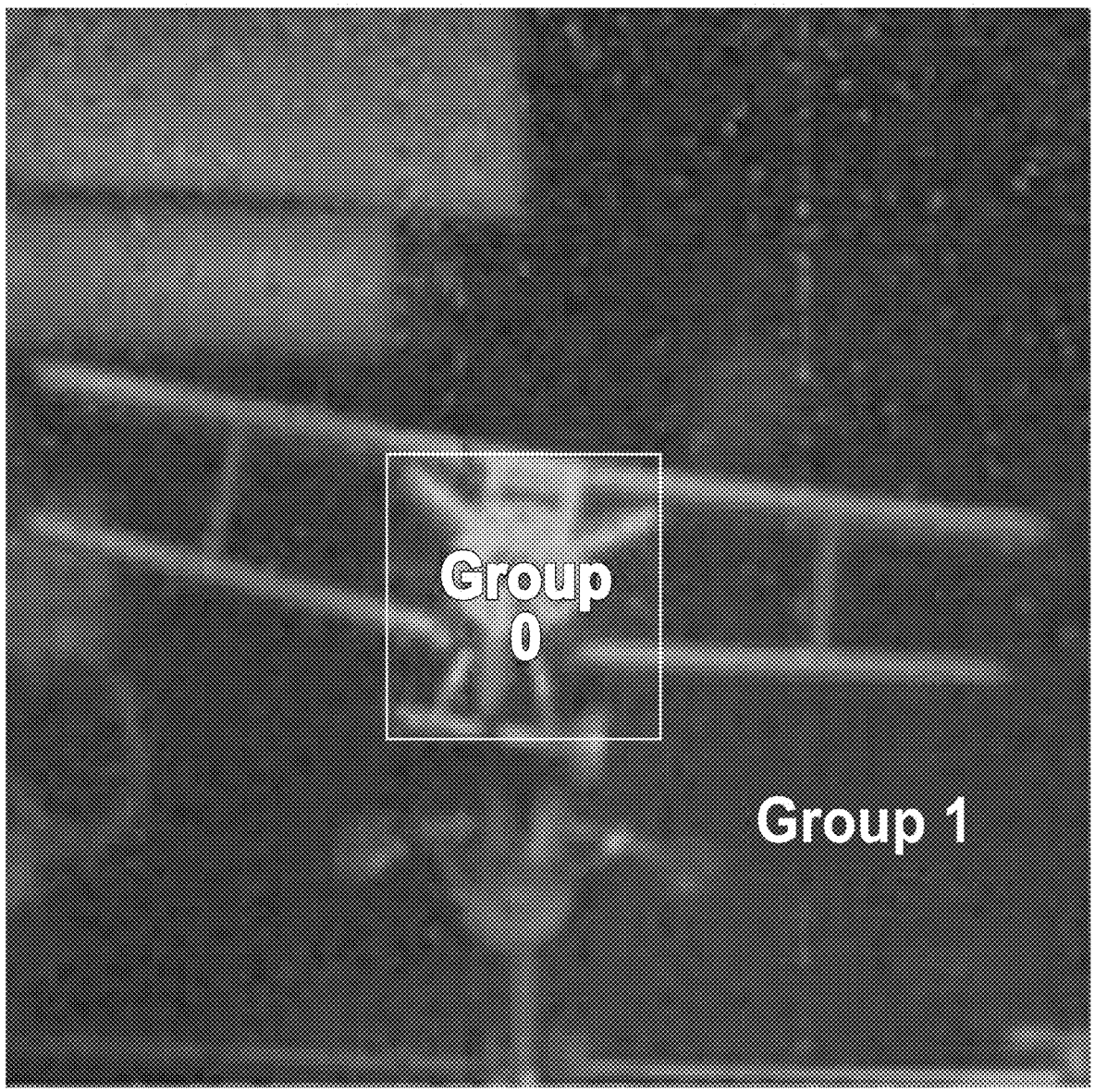
FIG. 18A is an annotated image frame showing pixel group assignments, according to some embodiments.
Figure 19:
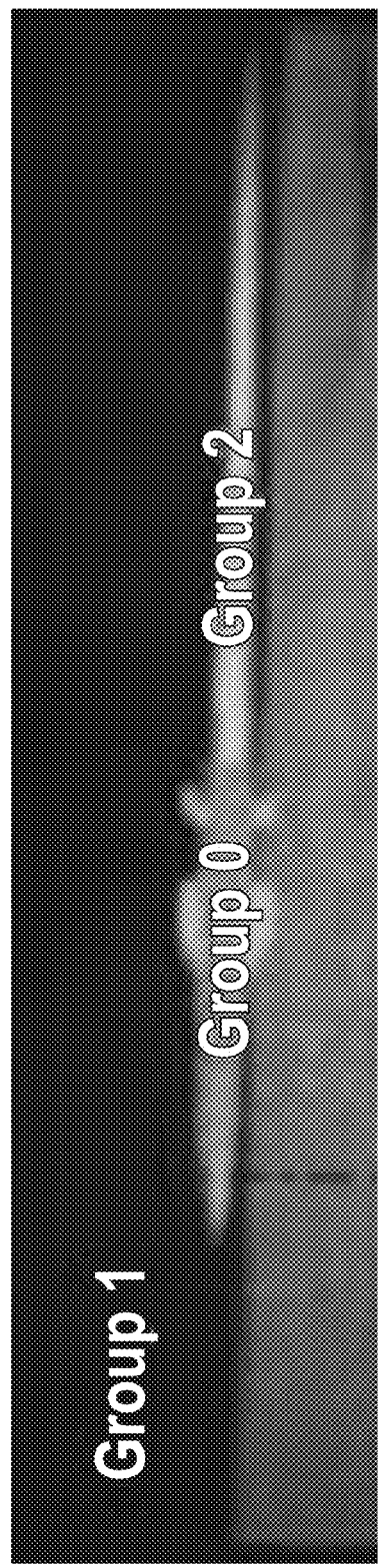
FIG. 19 is an annotated image frame showing pixel group assignments, according to some embodiments.

FIGS. 18A and 19 are annotated image frames showing pixel group assignments, according to some embodiments. Each pixel in the image is assigned to a group or region of interest (e.g., Groups "0" and "1" are defined in FIG. 18A, and Groups "0" through "2" are defined in FIG. 19). FIGS. 18B and 18C are image frames created using context-relevant signal processing (rotation compensation) within each group shown in FIG. 18A.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of designing and making the technology disclosed herein may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A focal plane imaging apparatus comprising:
   a photodetector array to convert light that is scattered and/or reflected from a scene into analog signals;

analog to digital converters (ADCs), electrically coupled to the photodetector array, to convert the analog signals into digital signals;

digital registers, electrically coupled to the ADCs, to store a two-dimensional space-time encoded measurement produced by modulating the digital signals with pseudorandom modulation; and a processor, operably coupled to the digital registers, to generate a three-dimensional representation of the scene from the two-dimensional space-time encoded measurement.

2. The focal plane imaging apparatus of claim 1, wherein the photodetector array has a readout rate slower than a modulation rate of the pseudorandom modulation.

3. The focal plane imaging apparatus of claim 1, wherein the processor is configured to generate the three-dimensional representation of the scene by applying a sparsity constraint to the two-dimensional space-time encoded measurement.

4. The focal plane imaging apparatus of claim 1, wherein the processor is configured to generate the three-dimensional representation of the scene by applying a two-step iterative shrinkage/thresholding (TwIST) total variation (TV) minimization process to the two-dimensional space-time encoded measurement.

5. The focal plane imaging apparatus of claim 1, wherein the processor is configured to extract at least one target from the three-dimensional representation of the scene.

6. The focal plane imaging apparatus of claim 1, wherein the processor is configured to extract at least one frequency from the three-dimensional representation of the scene.

7. The focal plane imaging apparatus of claim 1, further comprising:

circuitry, operably coupled to the ADCs and/or the digital registers, to generate the pseudorandom modulation.

8. The focal plane imaging apparatus of claim 7, wherein the circuitry is configured to modulate different digital signals with different pseudorandom modulation signals.

9. The focal plane imaging apparatus of claim 7, wherein the circuitry is configured to modulate a gain of the ADCs with the pseudorandom modulation.

10. The focal plane imaging apparatus of claim 7, wherein the circuitry is configured to modulate the digital registers with the pseudorandom modulation.

11. A method of focal plane imaging, the method comprising:

imaging a scene onto a photodetector array;

converting a photocurrent, generated by the photodetector array, into digital signals using analog-to-digital converters (ADCs);

storing, with digital registers operably coupled to the ADCs, a two-dimensional space-time encoded measurement produced by modulating the digital signals with pseudorandom modulation; and generating, with a processor operably coupled to the plurality of digital registers, a three-dimensional representation of the scene from the two-dimensional space-time encoded measurement.

12. The method of claim 11, wherein modulating the digital signals with the pseudorandom modulation occurs at a rate faster than a readout rate of the photodetector array.

13. The method of claim 11, wherein modulating the digital signals with the pseudorandom modulation comprises modulating different digital signals with different pseudorandom modulation signals.

14. The method of claim 11, wherein modulating the digital signals with the pseudorandom modulation comprises modulating a gain of at least one of the ADCs with the pseudorandom modulation.

15. The method of claim 11, wherein modulating the digital signals with the pseudorandom modulation comprises modulating at least one of the digital registers with the pseudorandom modulation.

16. The method of claim 11, wherein generating the three-dimensional representation of the scene comprises applying a sparsity constraint to the two-dimensional space-time encoded measurement.

17. The method of claim 11, wherein generating the three-dimensional representation of the scene comprises applying a two-step iterative shrinkage/thresholding (TwIST) total variation (TV) minimization process to the two-dimensional space-time encoded measurement.

18. The method of claim 11, further comprising:

extracting at least one target from the three-dimensional representation of the scene.

19. The method of claim 11, further comprising:

extracting at least one frequency from the three-dimensional representation of the scene.

* * * * *